United States Patent
Patel et al.

(10) Patent No.: US 11,147,309 B2
(45) Date of Patent: Oct. 19, 2021

(54) CONTAINER FOR SMOKELESS TOBACCO PRODUCTS COMPRISING A PULP MATERIAL AND RELATED PACKAGED PRODUCT ASSEMBLY AND METHOD

(71) Applicant: R.J. Reynolds Tobacco Company, Winston-Salem, NC (US)

(72) Inventors: Pankaj Patel, Clemmons, NC (US); August Joseph Borschke, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 262 days.

(21) Appl. No.: 14/735,812

(22) Filed: Jun. 10, 2015

(65) Prior Publication Data

US 2016/0360783 A1    Dec. 15, 2016

(51) Int. Cl.
*A24F 23/00* (2006.01)
*B65D 25/14* (2006.01)
(Continued)

(52) U.S. Cl.
CPC .............. *A24F 23/00* (2013.01); *B29C 41/22* (2013.01); *B29C 43/003* (2013.01); *B65D 1/22* (2013.01); *B65D 25/14* (2013.01); *D21J 3/10* (2013.01); *B29K 2001/00* (2013.01); *B29L 2031/7162* (2013.01); *B65D 43/0222* (2013.01);
(Continued)

(58) Field of Classification Search
CPC .......... A24F 23/00; A24F 23/02; B29C 41/22; B29C 43/00; B29C 43/003; B29C 43/02; B29L 2031/7162; B65D 1/22; B65D 25/14; B65D 43/0222; B65D 2543/00083; B65D 2543/00092; B65D 2543/00305; B65D 2543/00314; B65D 2543/00537; B65D 43/02; B29K 2001/00; B31B 1/00; B31B 49/00
See application file for complete search history.

(56) References Cited

U.S. PATENT DOCUMENTS 1,488,044 A * 3/1924 Harms ................ B65D 5/4204
                                                        206/247
1,525,745 A   2/1925 Keefer et al.
(Continued)

FOREIGN PATENT DOCUMENTS

GB      461372      2/1937
GB      501224      2/1939
(Continued)

OTHER PUBLICATIONS

"A closer look at Carlsberg's fiber bottle", Pat Reynolds, VP Editor (5 pgs.); Website Visited Jun. 25, 2015; http://www.packworld.com/package-type/containers/closer-look-carlsbergs-fiber-bottle?utm_source=eClip&utm_medium=newsletter&utm_campaign=eclip2015-06-25%20-%20Multi-Conveyor%20-%20Actual&spMailingID=11721135&spUserID=NzMzMjkzOTc4NWs2&spJobID=561747181&spReportId=NTYxNzQ3MTngxS0.
(Continued)

*Primary Examiner* — Bryon P Gehman
(74) *Attorney, Agent, or Firm* — Womble Bond Dickinson (US) LLP; Chris Humphrey; John V. Forcier

(57) ABSTRACT

A container configured to hold one or more units of a product is provided. The container may comprise a lid and a base. The lid and/or the base may be constructed from a pulp derived from a plant material. For example, the pulp derived from the plant material may be a wood pulp material. A related method is also provided.

15 Claims, 27 Drawing Sheets

(51) Int. Cl.
*B65D 1/22* (2006.01)
*B65D 43/02* (2006.01)
*B29C 41/22* (2006.01)
*D21J 3/10* (2006.01)
*B29C 43/00* (2006.01)
B29K 1/00 (2006.01)
B29L 31/00 (2006.01)

(52) U.S. Cl.
CPC ............. *B65D 2543/00083* (2013.01); *B65D 2543/00092* (2013.01); *B65D 2543/00305* (2013.01); *B65D 2543/00314* (2013.01); *B65D 2543/00537* (2013.01)

(56) References Cited

U.S. PATENT DOCUMENTS

| | | | |
|---|---|---|---|
| 2,136,557 A * | 11/1938 | Griffin | B31B 1/74 |
| | | | 493/328 |
| 2,179,231 A * | 11/1939 | Moore | B65D 43/20 |
| | | | 206/264 |
| 2,301,575 A * | 11/1942 | Otten | B65D 5/2009 |
| | | | 206/256 |
| D150,575 S | 8/1948 | Jay | |
| D153,670 S | 5/1949 | Derham | |
| D157,538 S | 2/1950 | Rossi | |
| 2,611,154 A * | 9/1952 | Chevrier | D21J 3/00 |
| | | | 493/108 |
| 3,206,016 A * | 9/1965 | Fowle | G03B 21/323 |
| | | | 206/403 |
| 4,098,421 A | 7/1978 | Foster | |
| 4,190,170 A | 2/1980 | Boyd | |
| 5,356,518 A | 10/1994 | Kelley et al. | |
| 7,048,975 B1 * | 5/2006 | Tojo | B65D 1/0207 |
| | | | 428/213 |
| 7,077,933 B2 | 7/2006 | Otani et al. | |
| 7,798,319 B1 * | 9/2010 | Bried | A24F 23/00 |
| | | | 206/242 |
| 7,878,324 B2 * | 2/2011 | Bellamah | A24F 23/00 |
| | | | 206/242 |
| D658,377 S | 5/2012 | Corwin et al. | |
| 8,215,482 B2 | 7/2012 | Cronin et al. | |
| D673,848 S | 1/2013 | Bailey et al. | |
| D674,688 S | 1/2013 | Loftin et al. | |
| D675,516 S | 2/2013 | Horton et al. | |
| 8,393,465 B2 * | 3/2013 | Clark | A24F 23/00 |
| | | | 206/242 |
| 8,458,996 B2 | 6/2013 | Bried et al. | |
| D690,588 S | 10/2013 | Pipes et al. | |
| D692,298 S | 10/2013 | Pipes et al. | |
| D704,050 S | 5/2014 | Pipes et al. | |
| 8,870,003 B2 * | 10/2014 | Dayton | B31B 43/00 |
| | | | 206/557 |
| 8,910,781 B2 | 12/2014 | Pipes et al. | |
| 9,717,272 B2 * | 8/2017 | Patel | B65D 51/1622 |
| 9,908,670 B2 * | 3/2018 | Patel | A24F 23/00 |
| 9,950,858 B2 * | 4/2018 | Byrd, Jr. | B65D 85/1018 |
| 9,968,130 B2 * | 5/2018 | Potter | A24F 23/00 |
| 2001/0025805 A1 | 10/2001 | Maki et al. | |
| 2007/0110928 A1 | 5/2007 | Bried et al. | |
| 2008/0202956 A1 | 8/2008 | Welk et al. | |
| 2010/0000888 A1 | 1/2010 | Cronin et al. | |
| 2010/0018883 A1 * | 1/2010 | Patel | A24B 13/00 |
| | | | 206/256 |
| 2010/0065076 A1 | 3/2010 | Bergstrom et al. | |
| 2010/0065077 A1 | 3/2010 | Lofgreen-Ohrn et al. | |
| 2011/0204015 A1 | 8/2011 | West et al. | |
| 2012/0193265 A1 | 8/2012 | Patel et al. | |
| 2012/0211016 A1 | 8/2012 | Byrd, Jr. et al. | |
| 2013/0276801 A1 | 10/2013 | Byrd, Jr. et al. | |
| 2013/0292279 A1 | 11/2013 | Bengtsson et al. | |
| 2014/0137518 A1 | 5/2014 | Griscik et al. | |
| 2015/0069063 A1 | 3/2015 | Yang et al. | |
| 2015/0136618 A1 | 5/2015 | Patel et al. | |
| 2015/0320113 A1 * | 11/2015 | Stebbins | A24F 23/02 |
| | | | 206/740 |

FOREIGN PATENT DOCUMENTS

| | | |
|---|---|---|
| GB | 2 513 165 | 10/2014 |
| WO | WO 2008/020768 | 2/2008 |
| WO | 2010/144340 | 12/2010 |
| WO | WO 2012/139590 | 10/2012 |
| WO | WO 2013/192260 | 12/2013 |
| WO | 2014031869 A1 | 2/2014 |
| WO | 2015/051107 | 4/2015 |

OTHER PUBLICATIONS

Durata® Permanent Waterproof Food Safe Bar Top and Wood Countertop Finish (2 pgs.); Website visited Jun. 10, 2015; http://www.glumber.com/wood-countertops-design-guide/wood-finish/durata-wood-countertop-finish/.

Molded-Pulp Bottle Disrupts Laundry Detergent Category, posted by Anne Marie Mohan, Editor, GreenPackage.com, Jul. 28, 2011 (2 pgs.); Website visited Jun. 10, 2015; http://www.greenerpackage.com/recycled_content/molded-pulp_bottle_disrupts_laundry_detergent_category.

Pulp Fact Not Fiction! PepsiCo files global paper bottle patent ; Ben Bouckley, Mar. 10, 2014 (3 pgs.); Website Visited Jun. 10, 2015; http://www.beveragedaily.com/Processing-Packaging/Pulp-fact-not-fiction!-PepsiCo-files-global-paper-bottle-patent.

Carlsberg Hopes for 'Viable' Wood Fiber Beer Bottle Within Three Years, Ben Bouckley, Jan. 27, 2015 (2 pgs.); Website visited Jun. 10, 2015; http://www.beveragedaily.com/Processing-Packaging/Carlsberg-hopes-for-viable-wood-fiber-beer-bottle-within-three-years.

PaperBoy Paper Wine Bottle a U.S. First, Anne Marie Mohan, Senior Editor (5 pgs.) Website visited Jun. 10, 2015; http://www.packworld.com/sustainability/renewable-resources/paperboy-paper-wine-bottle-us-first.

Smart Planet Technologies, Earth Coating® Technology (4 pgs.) Website visited Jun. 10, 2015 http://smartplanettech.com/earthcoating-technology/

New Stretchable, Shapeable Paper Creates Unique 3D Packages, Lisa McTigue Pierce (https://plus.google.com/105400479 12101795696) in Packaging Design (/taxonomy/term/54) on May 20, 2015 (5 pgs.); Website visited Jun. 10, 2015; http://www.packagingdigest.com/packaging-design/new-stretchable-shapeable-paper-creates-unique-3d-packages.

Plastic Ingenuity, Green Ingenuity—Pulp Thermoforming and Molded Fiber Packaging (1 pg.); Website visited Jun. 10, 2015; http://www.plasticingenuity.com/green-ingenuity/pulp-thermoforming/.

Bio Pulp Works, This Old House Magazine: What's New in Tools and Home Products, The Hardware Aisle, Biodegradable Paint Tray (1 pg.); Website visited Jun. 10, 2015; http://www.biopulpworks.com/in-the-news/this-old-house-magazine-whats-new-in-tools-and-home-products.

Written Opinion of the International Preliminary Examining Authority dated May 8, 2017 in corresponding application PCT/US2016/036205 filed Jun. 7, 2016.

* cited by examiner

CONTAINER FOR SMOKELESS TOBACCO PRODUCTS COMPRISING A PULP MATERIAL AND RELATED PACKAGED PRODUCT ASSEMBLY AND METHOD

FIELD OF THE DISCLOSURE

The present disclosure relates to containers, packaged product assemblies, and methods of use thereof. More particularly, the disclosure relates to packaging for products made or derived from tobacco, or that otherwise incorporate tobacco, and are intended for human consumption in a smokeless form.

BACKGROUND OF THE DISCLOSURE

Various types of containers for dispensing solid objects, particularly solid products intended for human consumption, are known in the art. Such containers are often characterized by a hand-held size that can be easily stored and transported. Exemplary consumable products that are often packaged in such containers include a wide variety of consumer products, including "smokeless" tobacco-related products.

Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; U.S. Pat. No. 7,694,686 to Atchley et al.; U.S. Pat. No. 7,810,507 to Dube et al.; U.S. Pat. No. 7,819,124 to Strickland et al.; U.S. Pat. No. 7,861,728 to Holton, Jr. et al.; U.S. Pat. No. 7,901,512 to Quinter et al.; U.S. Pat. No. 8,168,855 to Neilsen et al.; U.S. Pat. No. 8,336,557 to Kumar et al.; U.S. Pat. No. 8,469,036 to Strickland et al.; U.S. Pat. No. 8,627,828 to Strickland et al.; and U.S. Pat. No. 8,940,344 to Crawford et al.; U.S. Patent Application Pub. Nos. 2004/0020503 to Williams; 2007/0062549 to Holton, Jr. et al.; 2008/0029116 to Robinson et al.; 2008/0029117 to Mua et al.; 2008/0173317 to Robinson et al.; 2008/0196730 to Engstrom et al.; 2009/0065013 to Essen et al.; and 2010/0291245 to Gao et al.; PCT Pub. Nos. WO 04/095959 to Arnarp et al.; and WO 10/132444 to Atchley; each of which is incorporated herein by reference.

Representative smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

Representative types of snuff products, commonly referred to as "snus," are manufactured in Europe, particularly in Sweden, by or through companies such as Swedish Match AB, Fiedler & Lundgren AB, Gustavus AB, Skandinavisk Tobakskompagni A/S and Rocker Production AB. Snus products previously or currently available in the U.S.A. have been marketed under the trade names such as CAMEL Snus Frost, CAMEL Snus Original, and CAMEL Snus Spice, CAMEL Snus Mint, CAMEL Snus Mellow, CAMEL Snus Winterchill, and CAMEL Snus Robust by R. J. Reynolds Tobacco Company.

Snus products, such as CAMEL Snus Original, are commonly supplied in small teabag-like pouches. The pouches are typically a nonwoven fleece material, and contain about 0.4 to 1.5 grams of pasteurized tobacco. These products typically remain in a user's mouth for about 10-30 minutes. Unlike certain other smokeless tobacco products, snus does not require expectoration by the user.

Snus products have been packaged in tins, "pucks" or "pots" that are manufactured from metal or plastic such as those disclosed in U.S. Pat. No. 4,098,421 to Foster, U.S. Pat. No. 4,190,170 to Boyd, and U.S. Pat. No. 8,215,482 to Cronin et al., and U.S. Patent Application Pub. Nos. 2008/0202956 to Welk et al.; 2010/0065076 to Bergstrom et al.; 2010/0065077 to Lofgreen-Ohrn et al.; and 2015/0136618 to Patel et al., each of which is incorporated by reference herein.

However, it may be desirable to provide containers formed from different materials defining differing properties (e.g., texture, appearance, attractiveness) as compared to materials (e.g., plastic and metal) traditionally employed in containers.

BRIEF SUMMARY OF THE DISCLOSURE

In one aspect, a container is provided. The container may include a lid and a base. The lid may include a top wall and one or more lid sidewalls extending from the top wall to a lower lip defining a lid opening. The base may be moveable with respect to the lid between a coupled configuration in which an internal storage compartment defined by the base is substantially closed and a decoupled configuration in which the internal storage compartment is open. The base may include a bottom wall and one or more base sidewalls extending from the bottom wall to an upper lip defining a base opening. At least one of the lid and the base may be constructed of a pulp derived from a plant material.

In some embodiments the pulp derived from the plant material may include a wood pulp material. The plant material may be the majority of the weight of the pulp. Additionally, at least one of the lid and the base may further include a coating. The coating may be positioned at an exterior of at least one of the lid and the base and may not be positioned at an interior of the lid and the base.

In some embodiments at least one of the base and the lid may include a liner. Further, the container may be provided in combination with a plurality of units of a product received in the internal storage compartment. The product may be selected from the group consisting of pharmaceutical products, smoking products, smokeless tobacco products, and consumable products. The product may be a smokeless tobacco product. The base may include an intermediate wall including the pulp derived from the plant material.

In an additional aspect a method for manufacturing a container is provided. The method may include constructing at least one of a base and a lid from a pulp derived from a plant material. The lid may include a top wall and one or more lid sidewalls extending from the top wall to a lower lip defining a lid opening. The base may include a bottom wall and one or more base sidewalls extending from the bottom wall to an upper lip defining a base opening. The base may be moveable with respect to the lid between a coupled configuration in which an internal storage compartment defined by the base is substantially closed and a decoupled configuration in which the internal storage compartment is open.

In some embodiments constructing at least one of the base and the lid from the pulp derived from the plant material may include directing the pulp derived from the plant material into a base mold and a lid mold. The method may further include applying pressure to the pulp derived from the plant material in the base mold and the lid mold. Applying pressure to the pulp derived from the plant material may include expanding a base expandable device within the base mold and expanding a lid expandable device within the lid mold.

In some embodiments the method may additionally include drying the pulp derived from the plant material. Further, the method may include removing the lid from the lid mold and removing the base from the base mold. Directing the pulp derived from the plant material into the base mold and the lid mold may include spraying the pulp derived from the plant material into the base mold and the lid mold. The method may additionally include applying a coating to at least one of the base and the lid. Applying the coating to at least one of the base and the lid may include applying the coating to an exterior of the lid and the base without applying the coating to the interior of the lid and the base. Further, the method may include coupling a liner to the pulp derived from the plant material.

These and other features, aspects, and advantages of the disclosure will be apparent from a reading of the following detailed description together with the accompanying drawings, which are briefly described below.

BRIEF DESCRIPTION OF THE DRAWINGS

Figure 1:
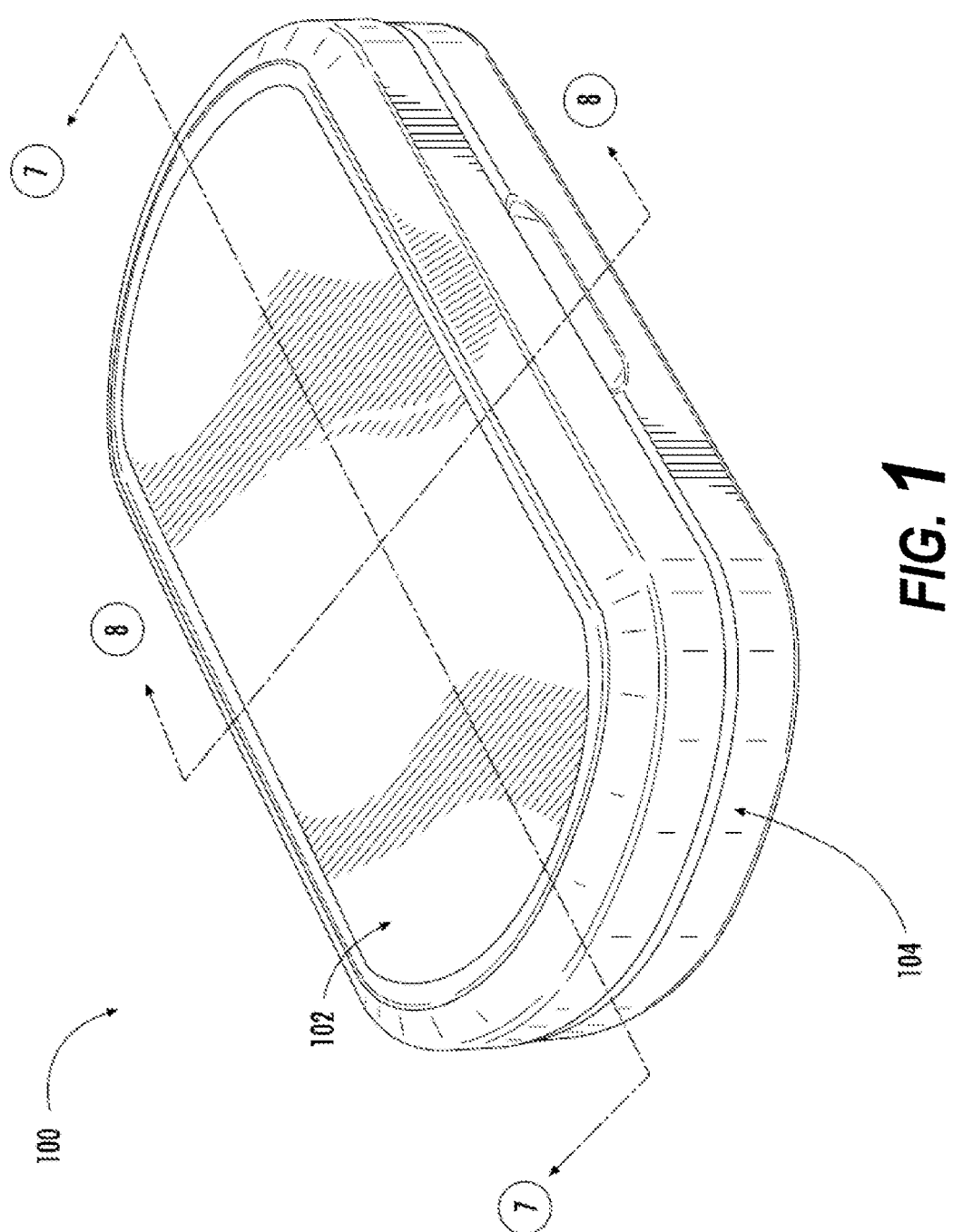
Figure 2:
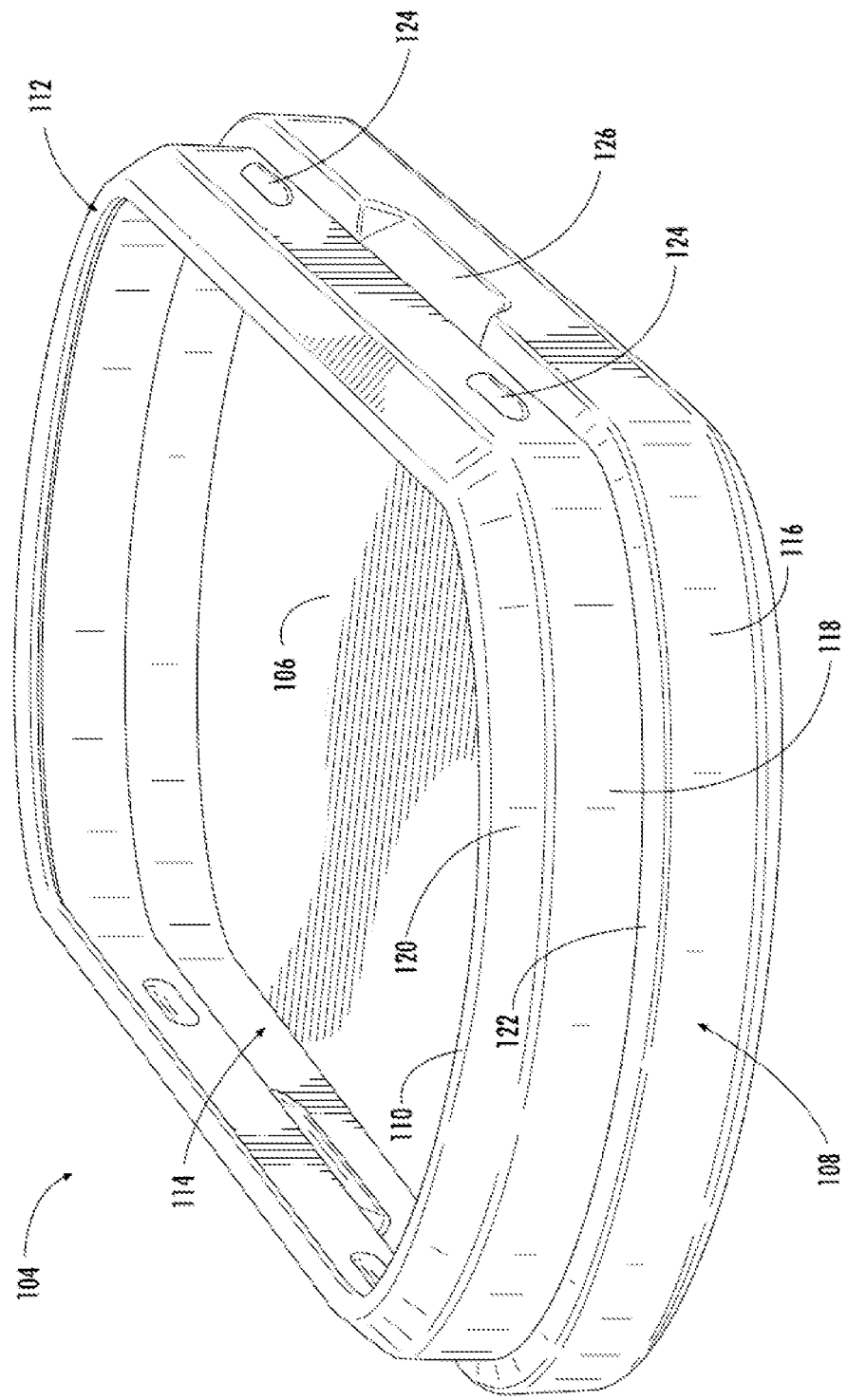
Figure 3:
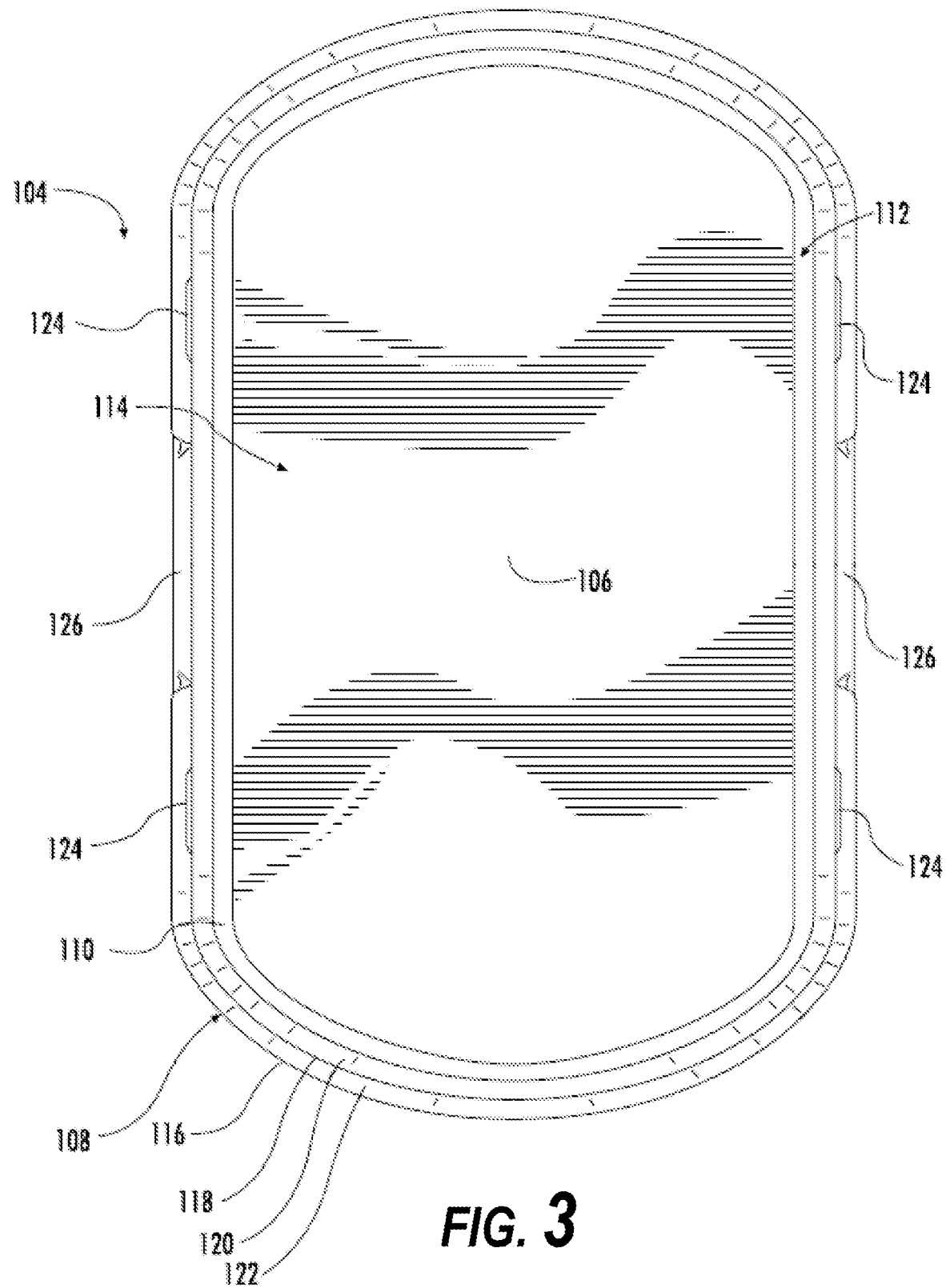
Figure 4:
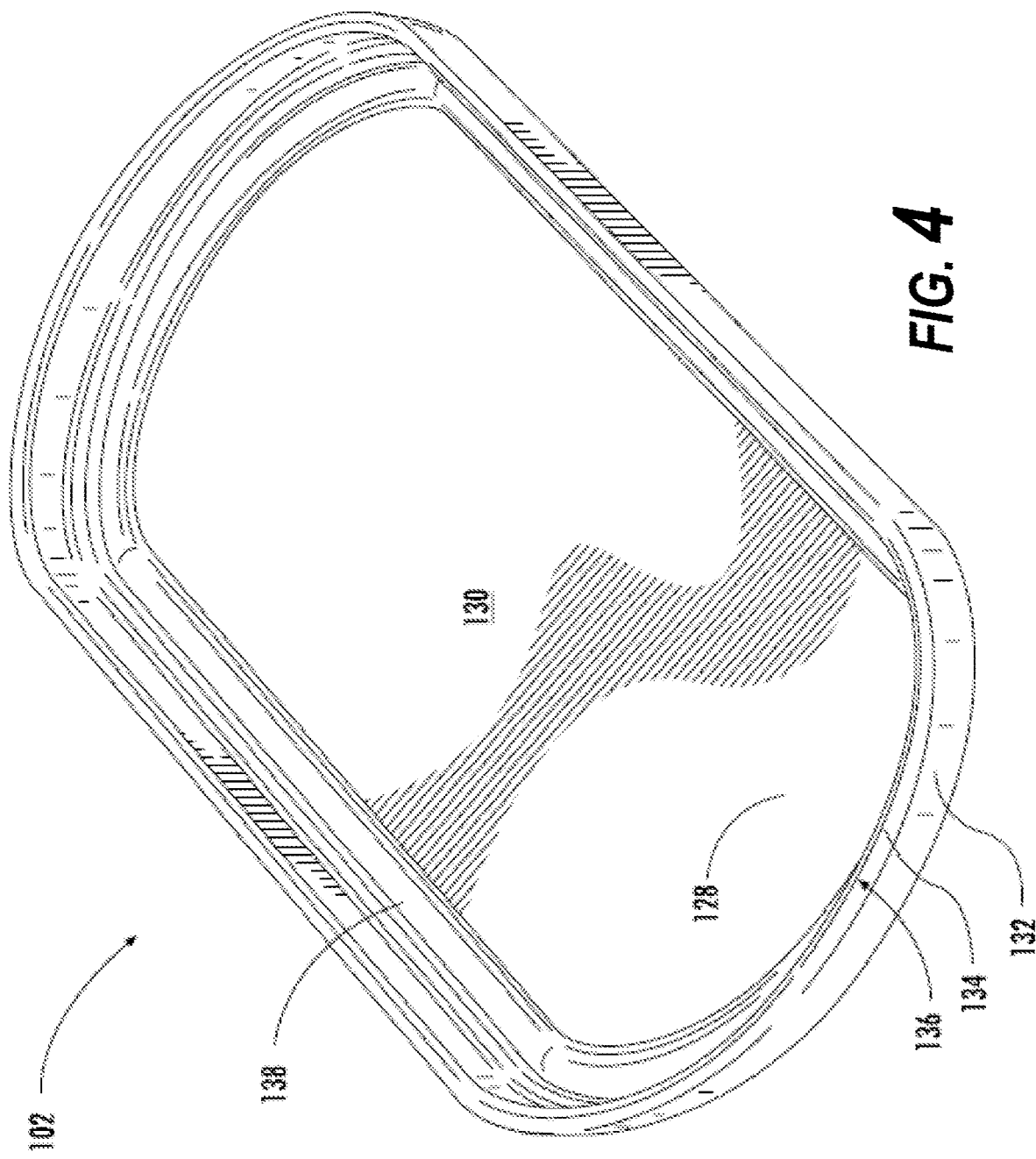
Figure 5:
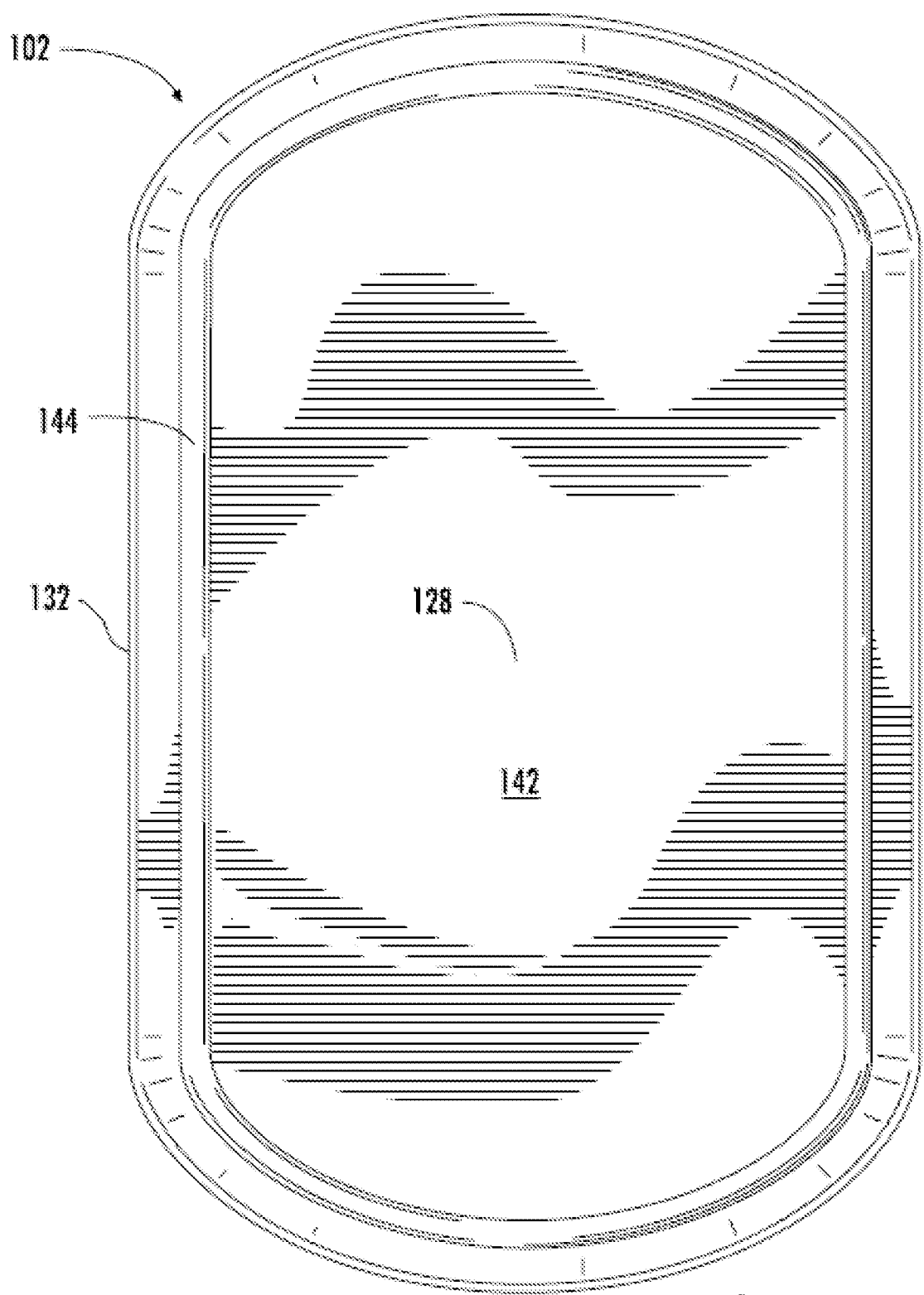
Figure 6:
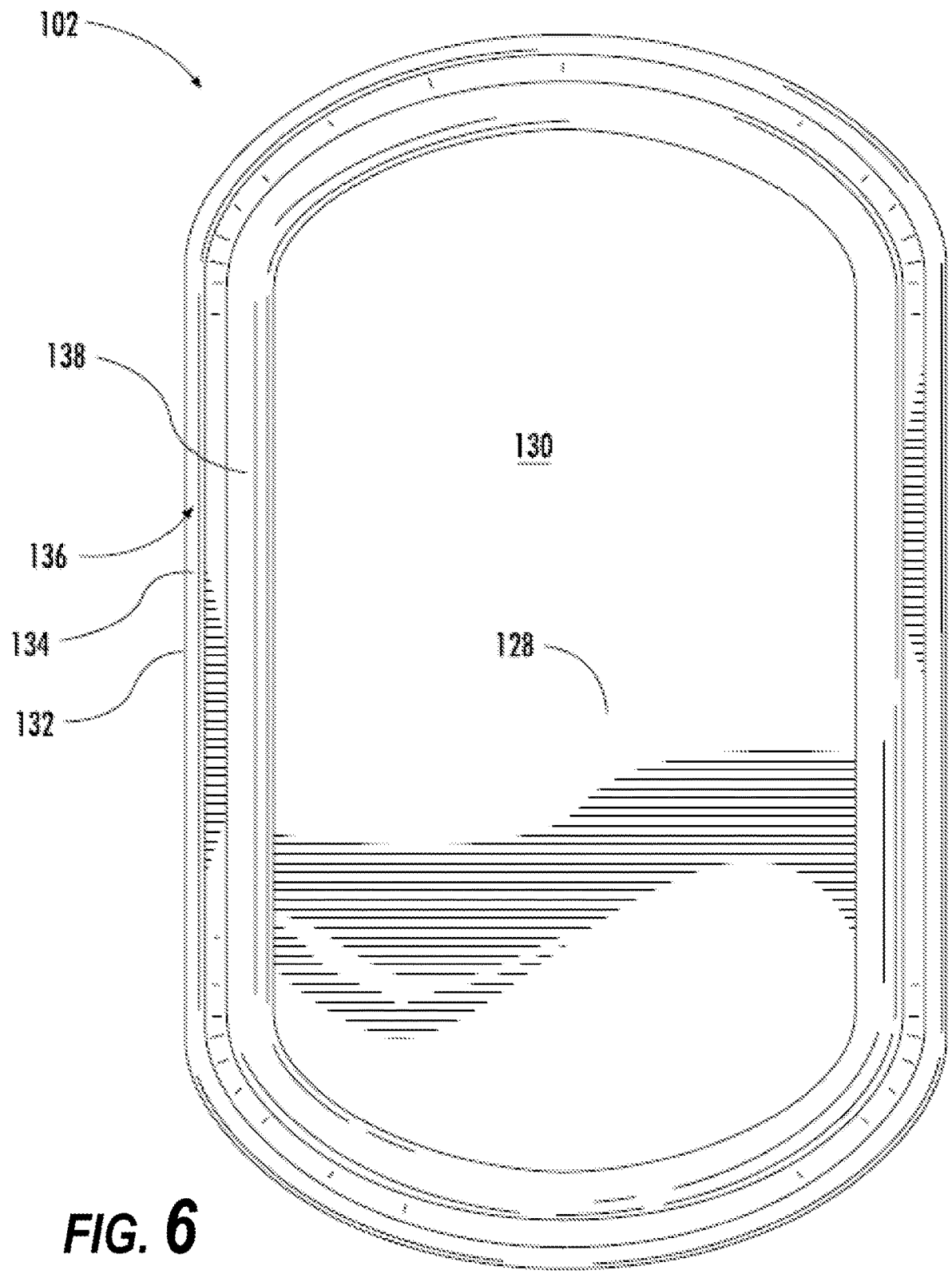
Figure 7:
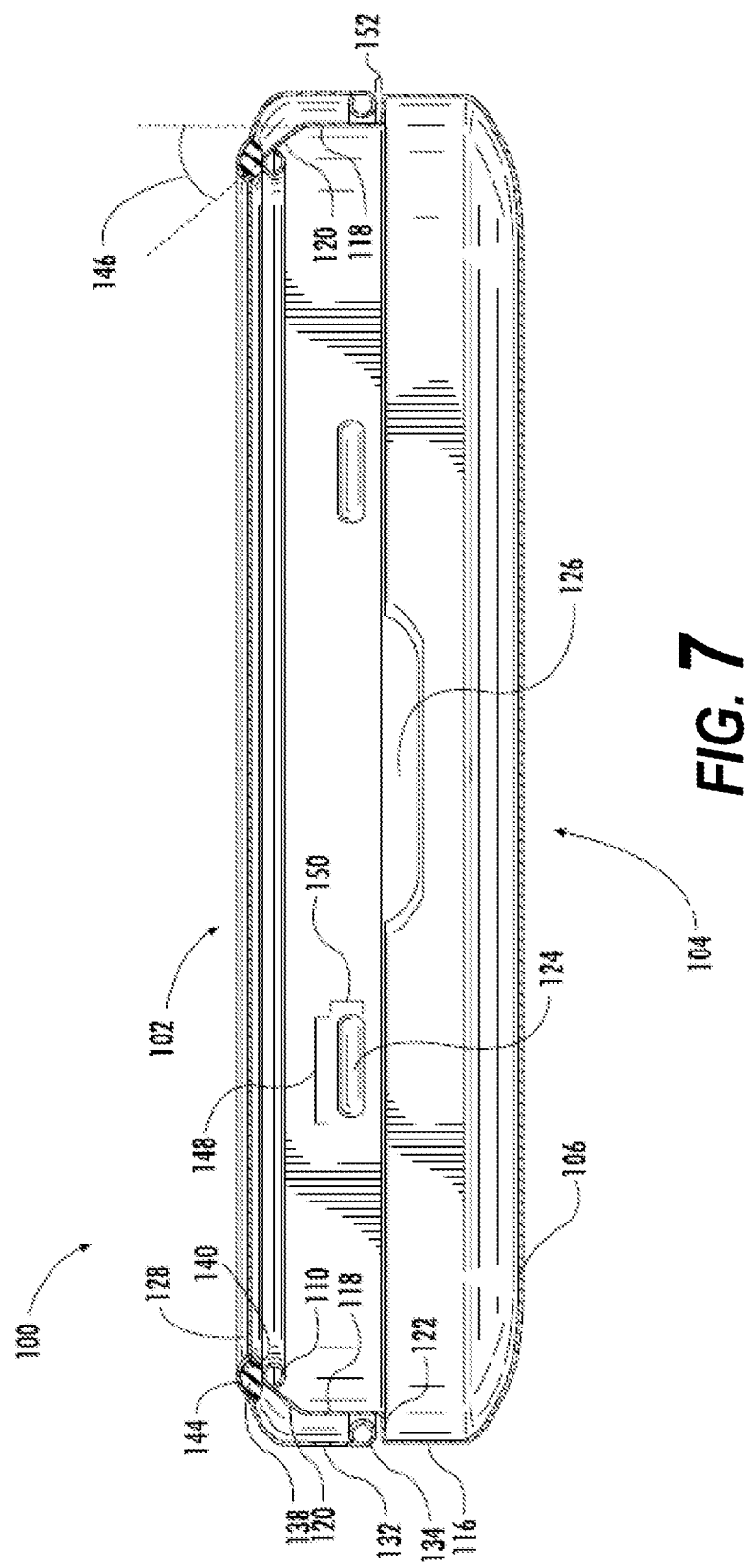
Figure 8:
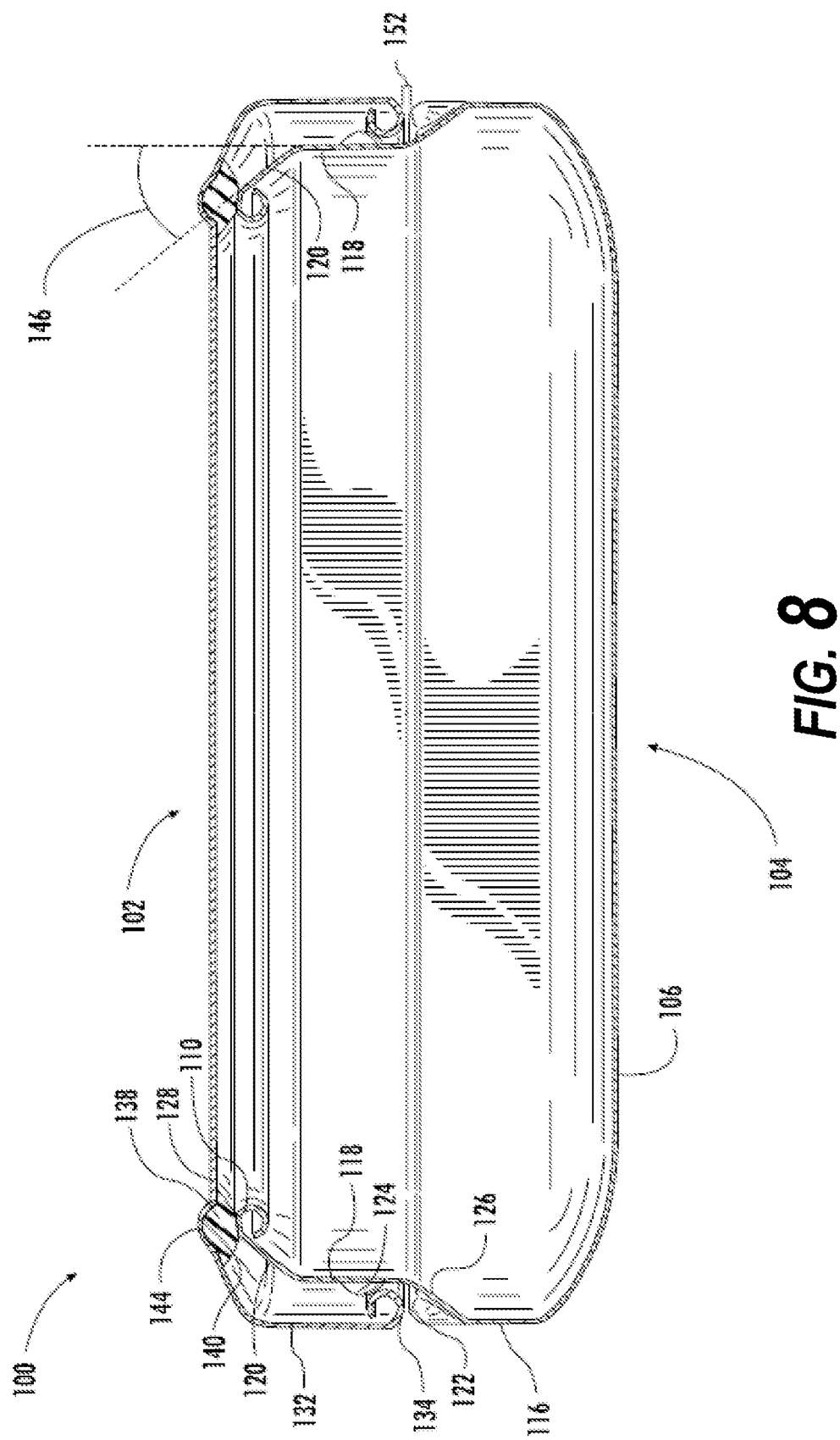
Figure 9:
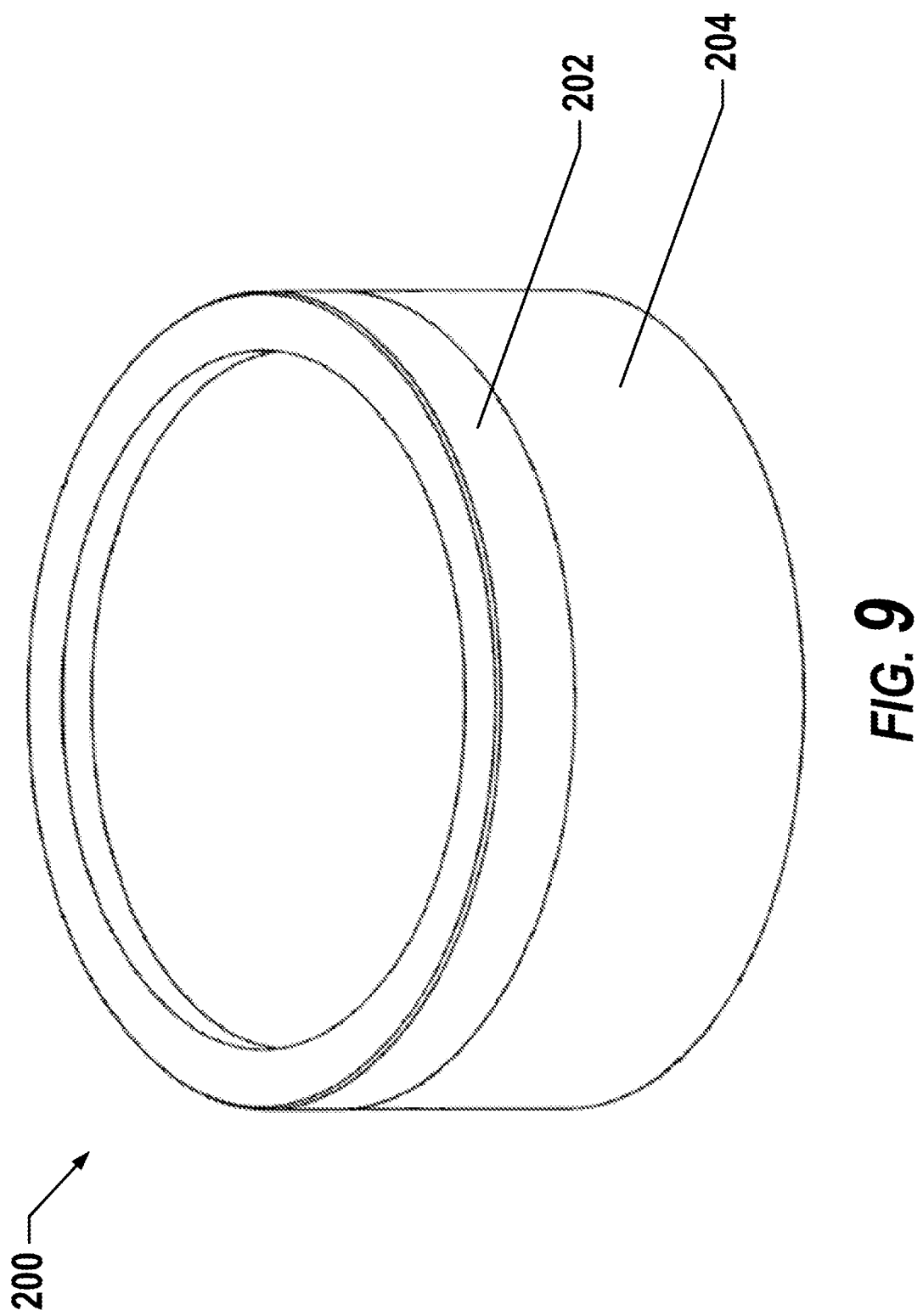
Figure 10:
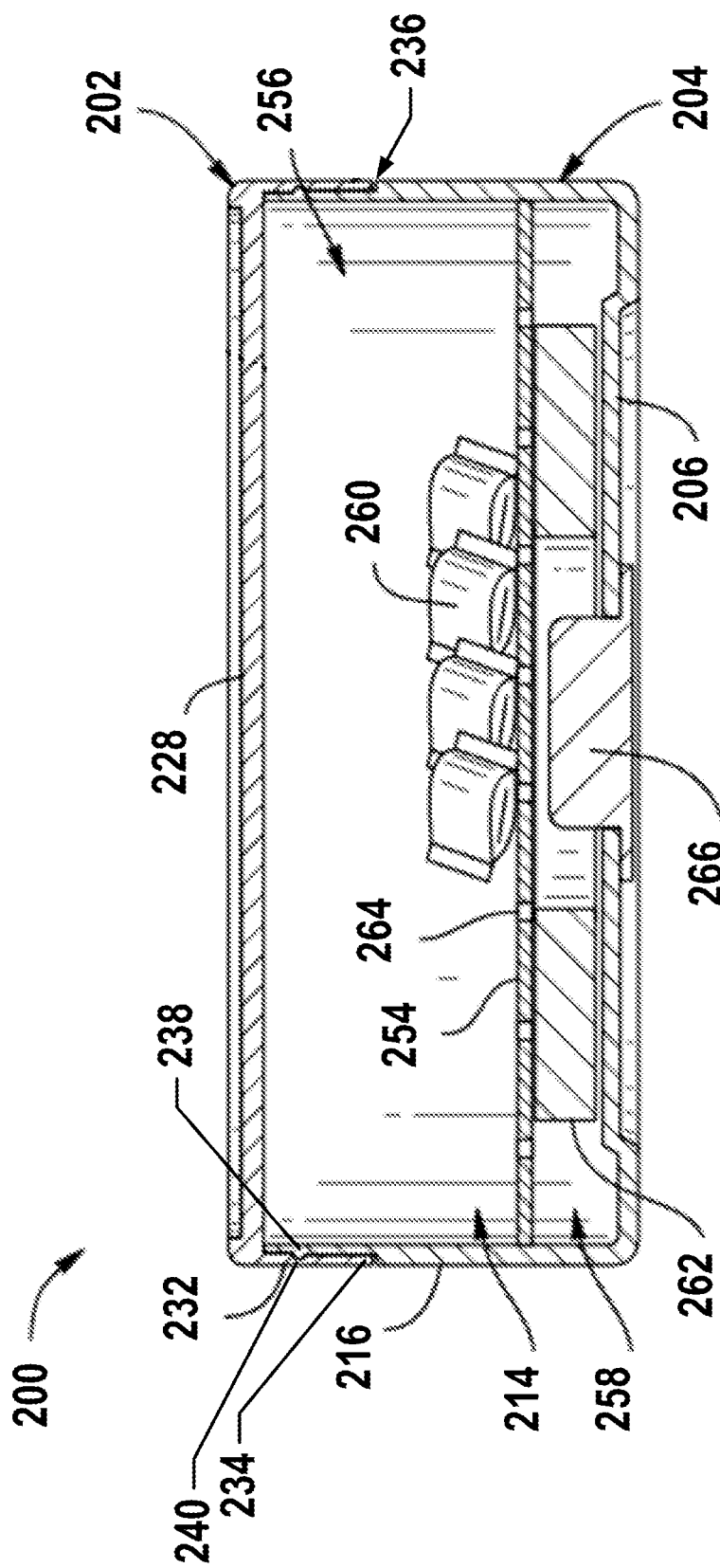
Figure 11:
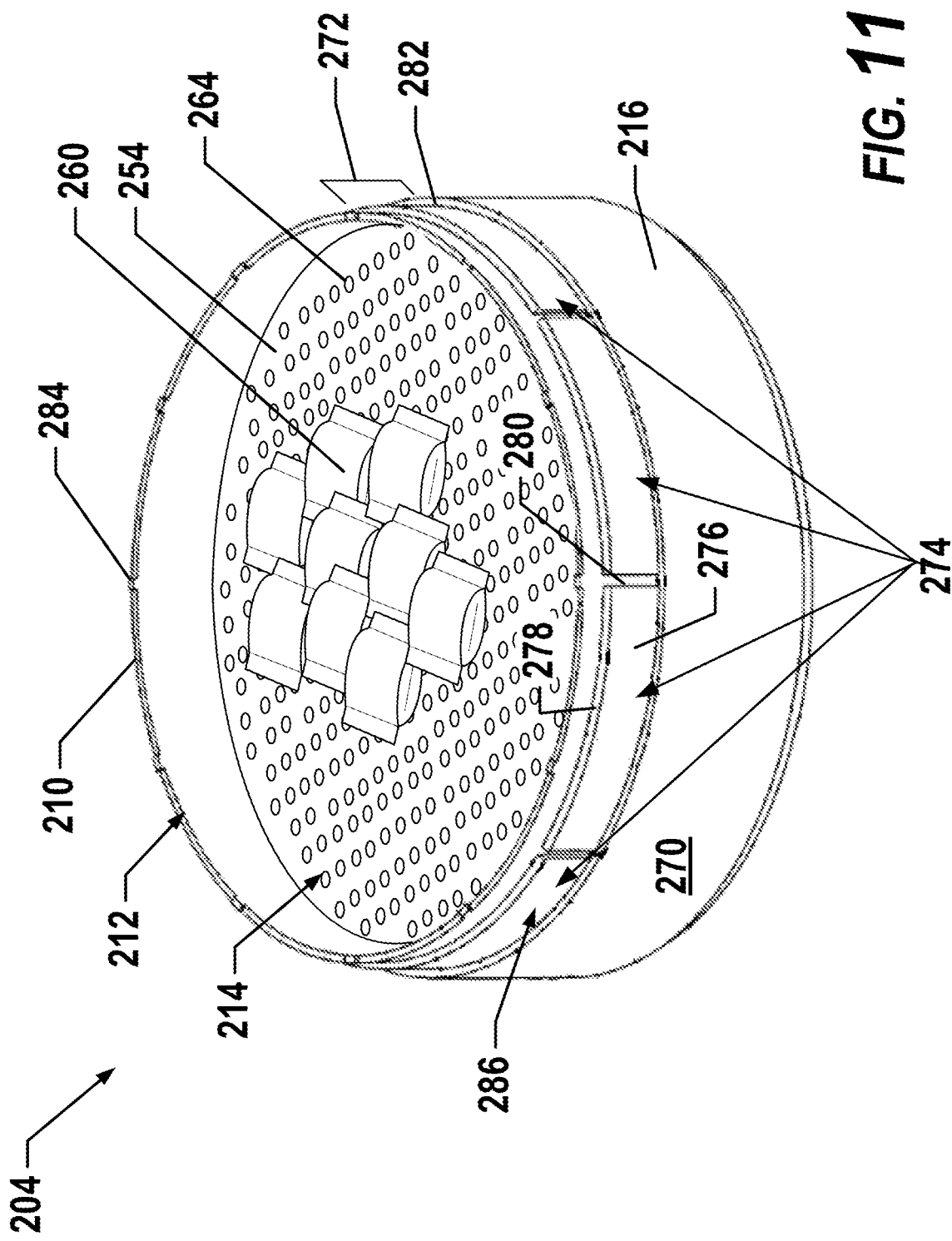
Figure 12:
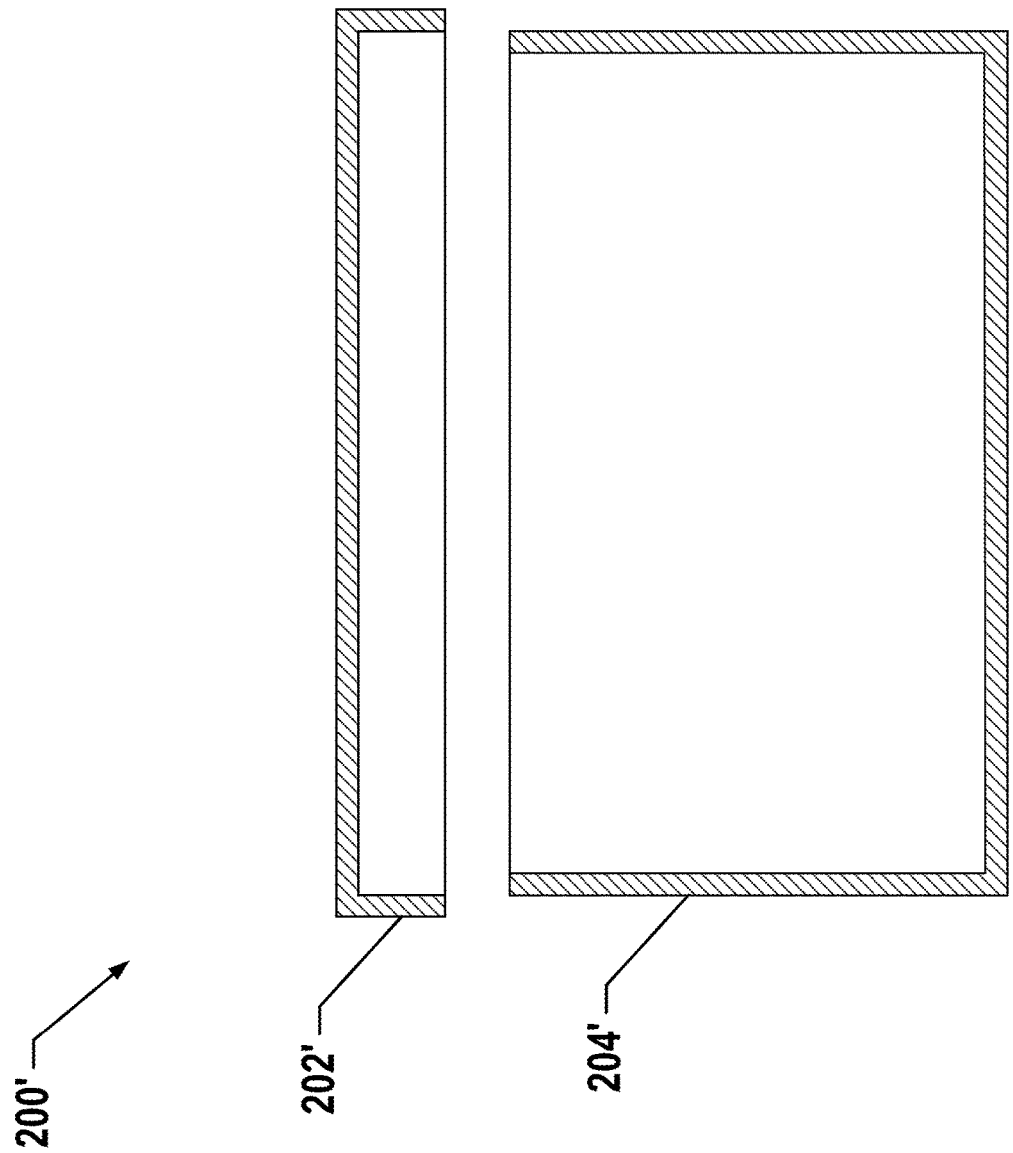
Figure 13:
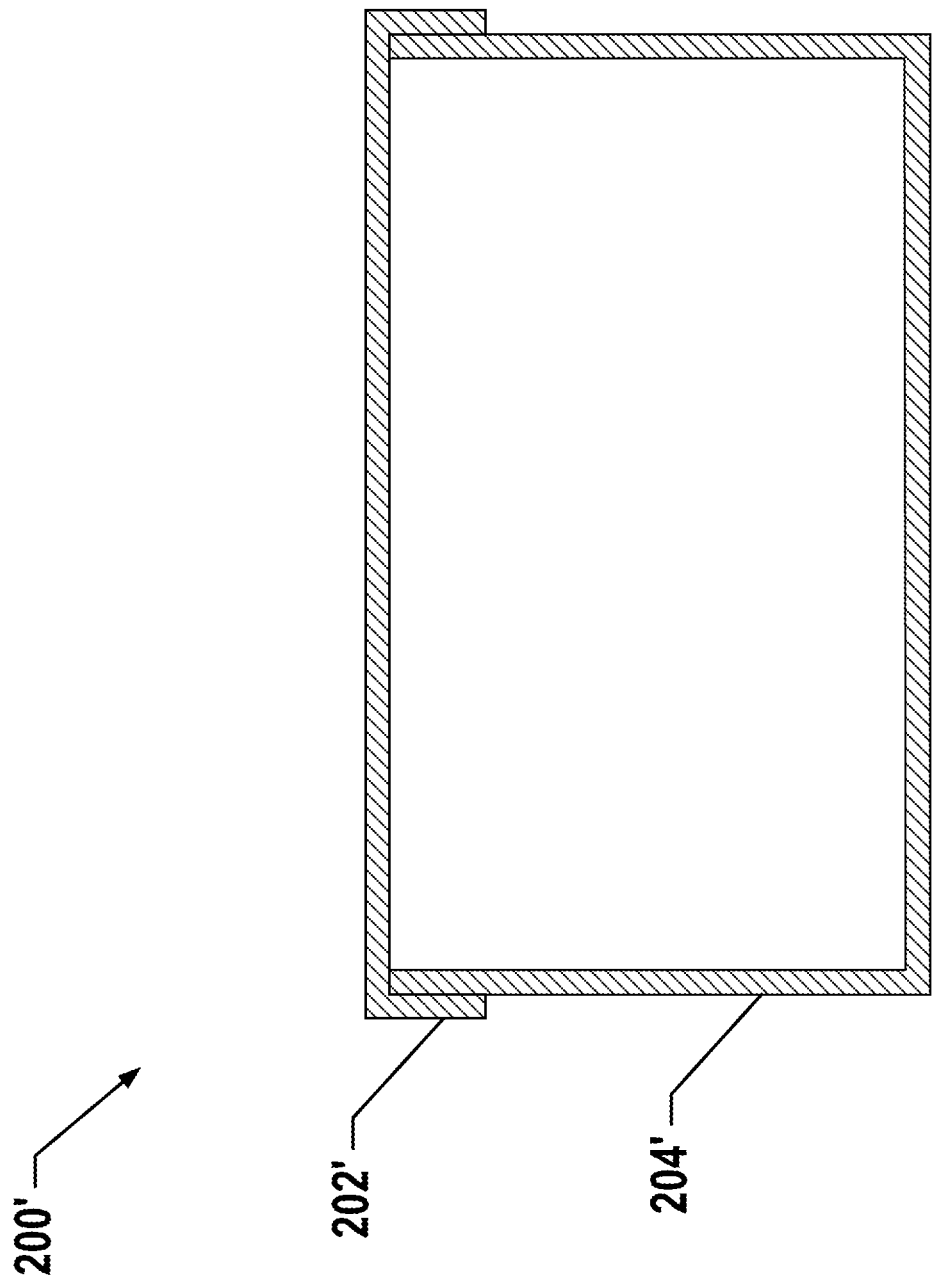
Figure 14:
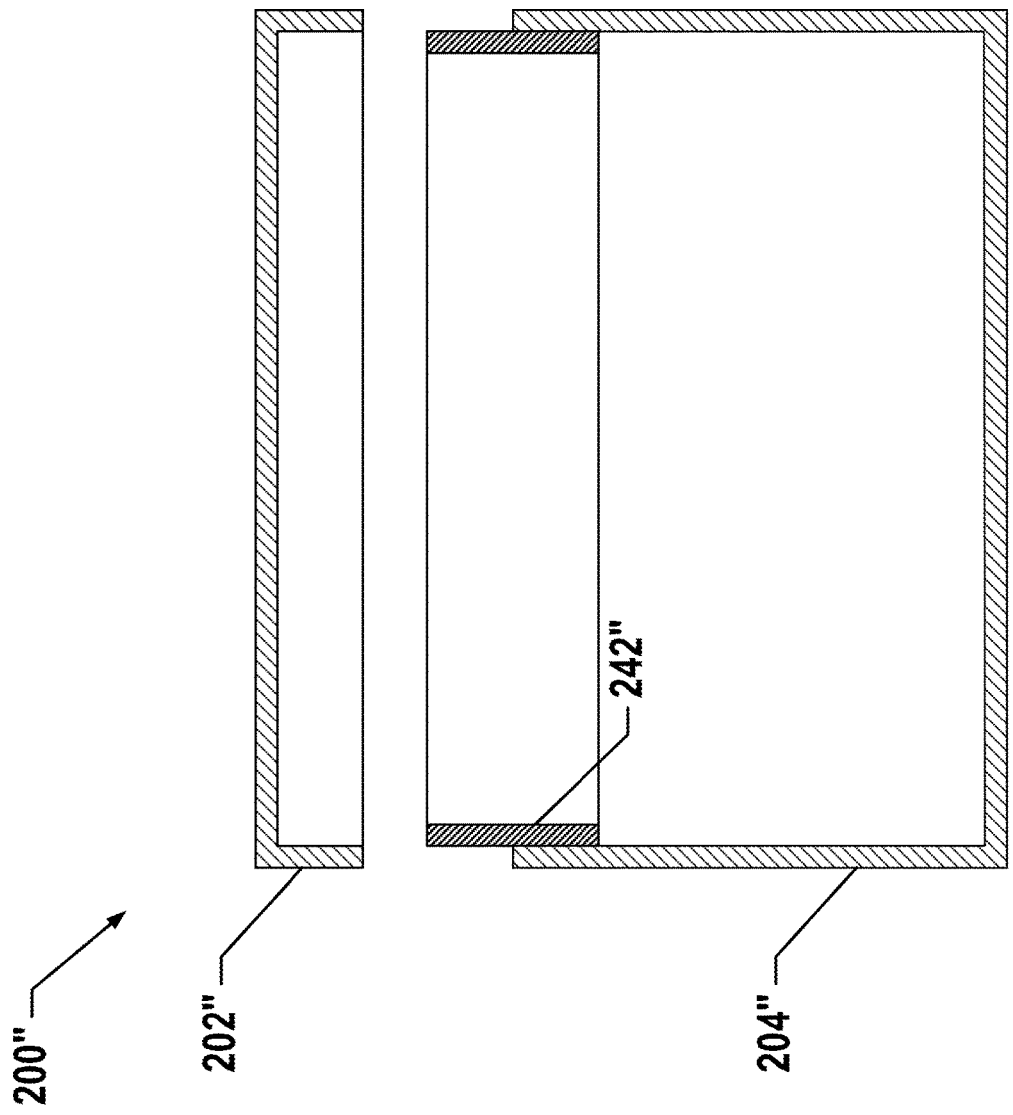
Figure 15:
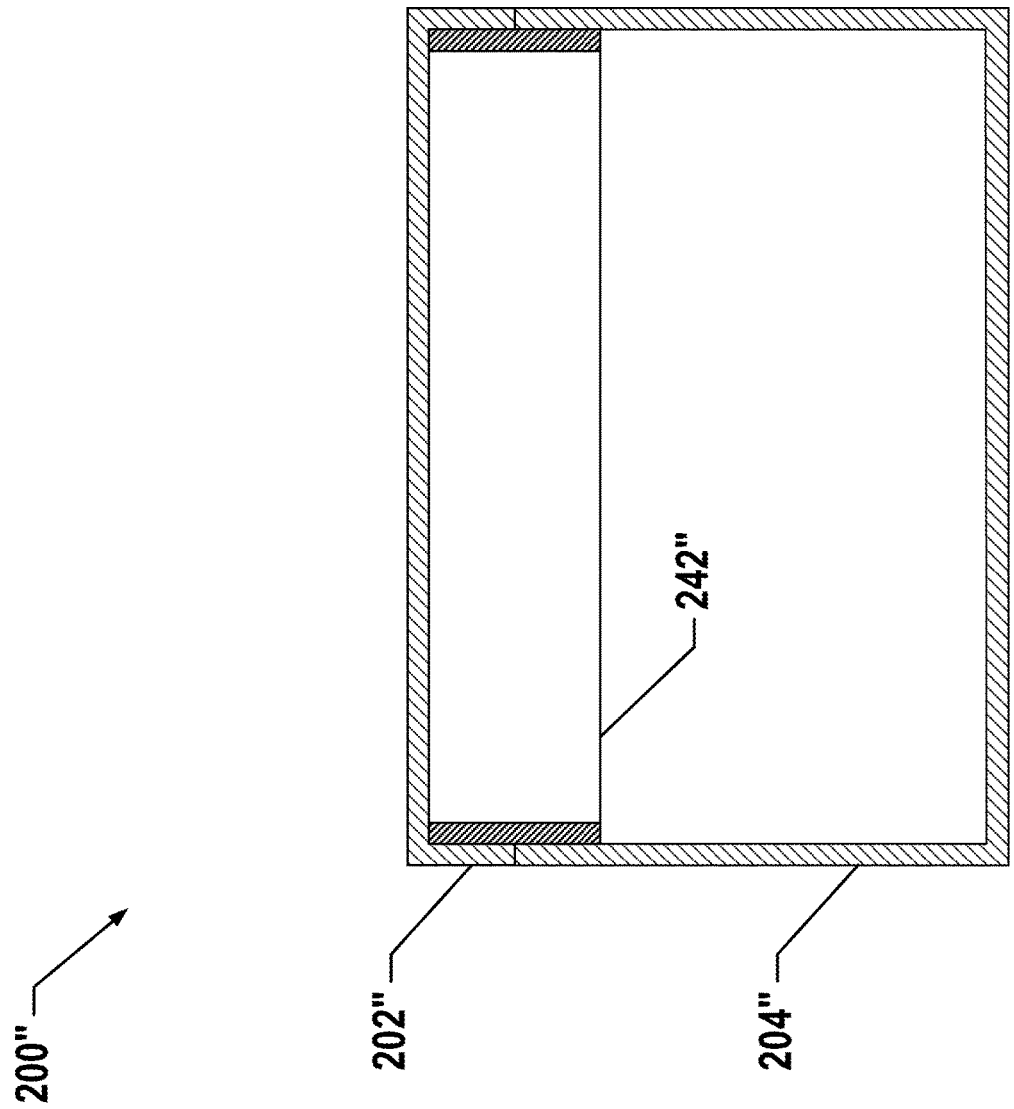
Figure 16:
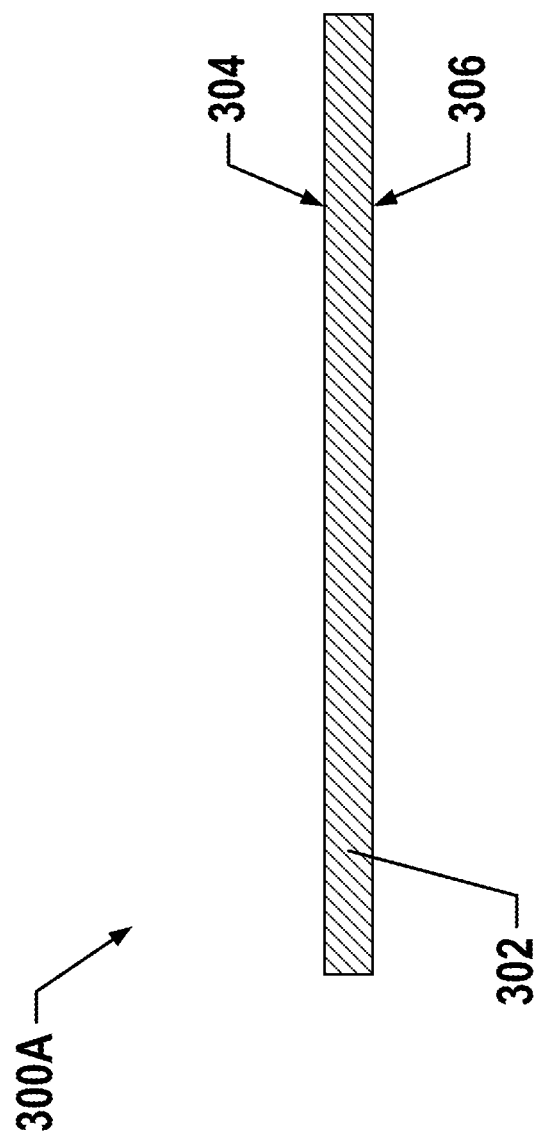
Figure 17:
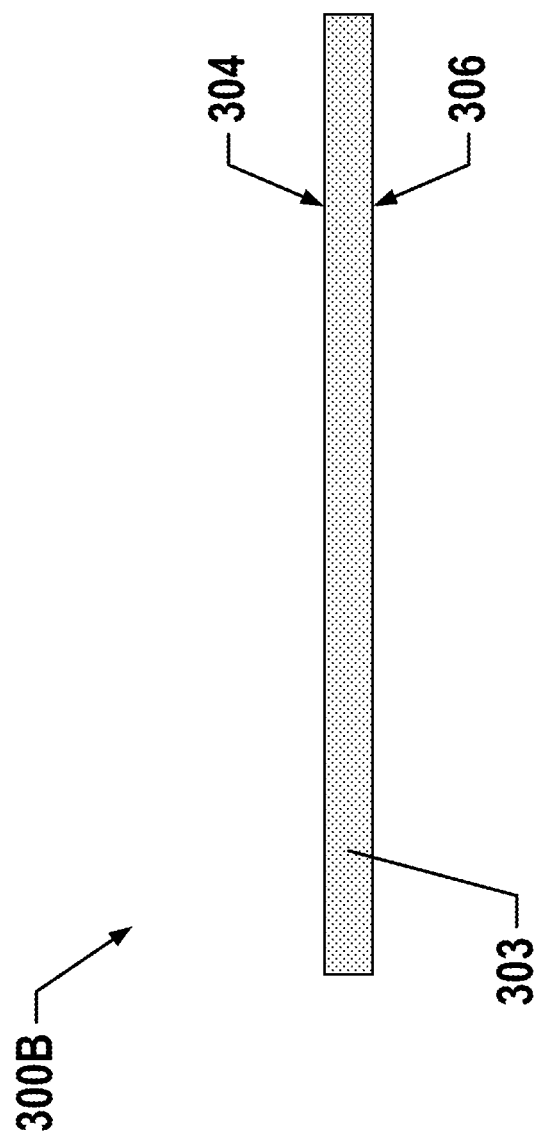
Figure 18:
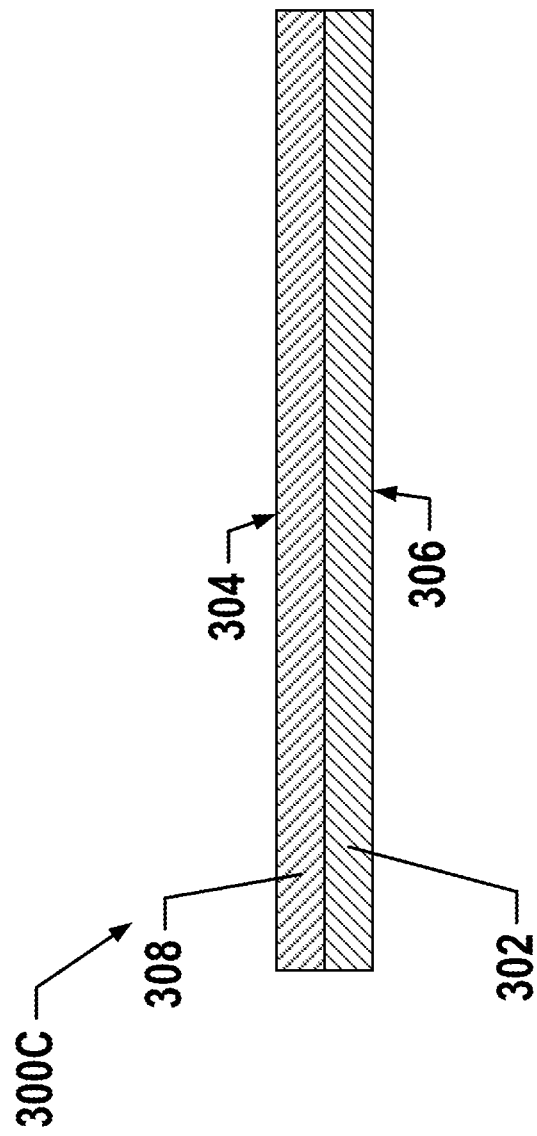
Figure 19:
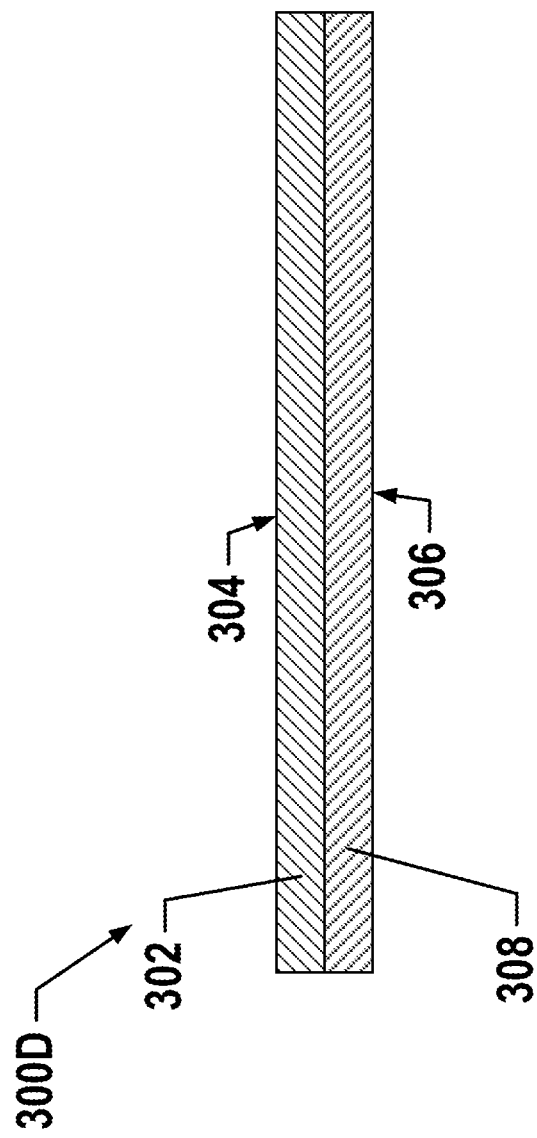
Figure 20:
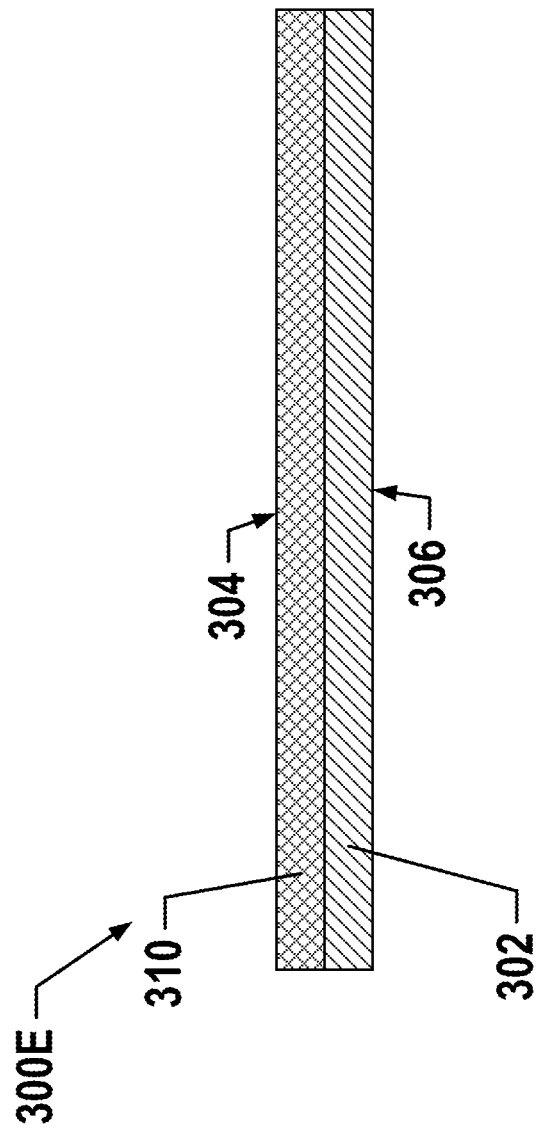
Figure 21:
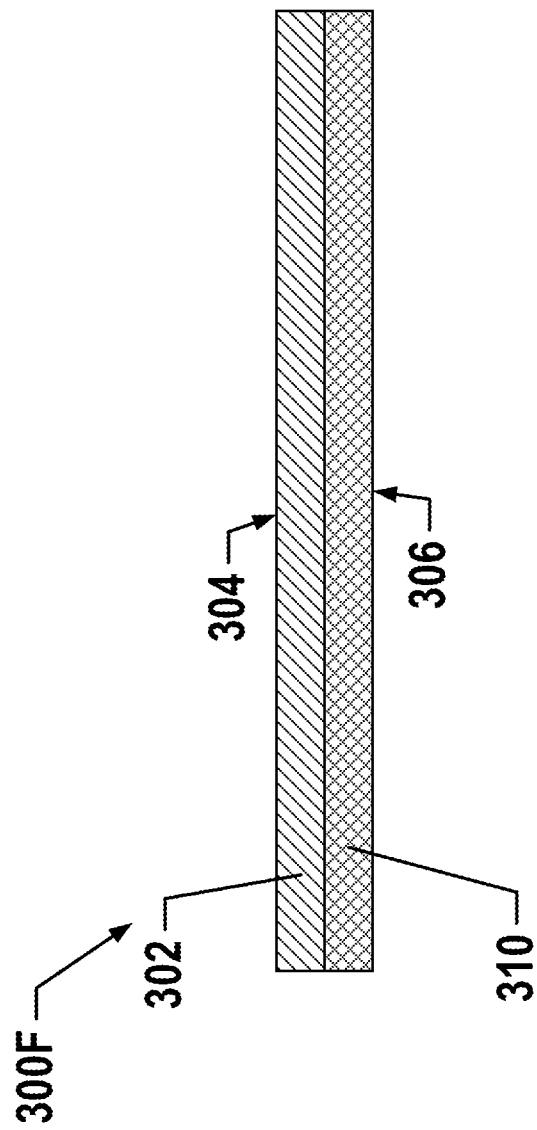
Figure 22:
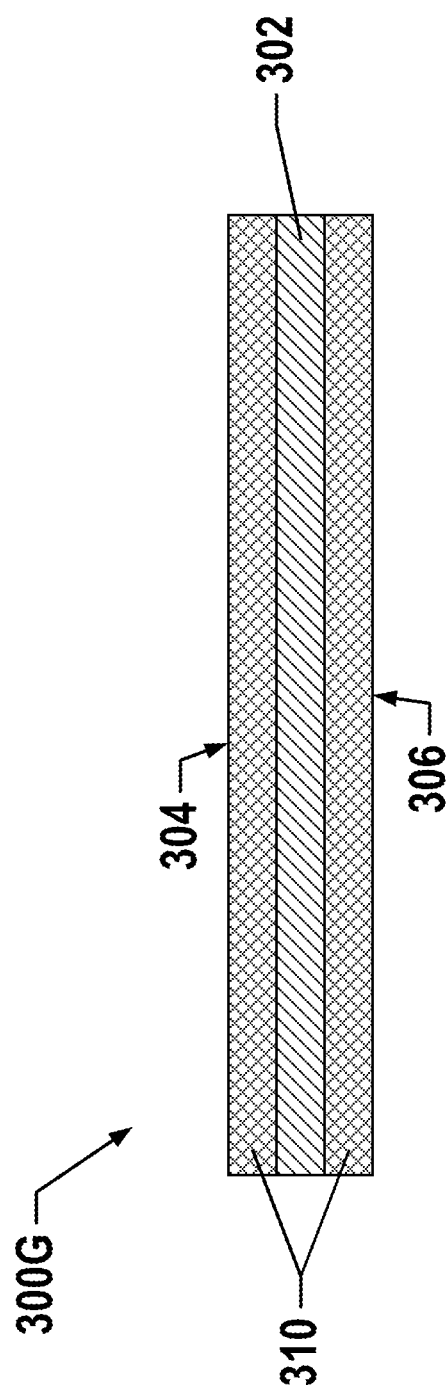
Figure 23:
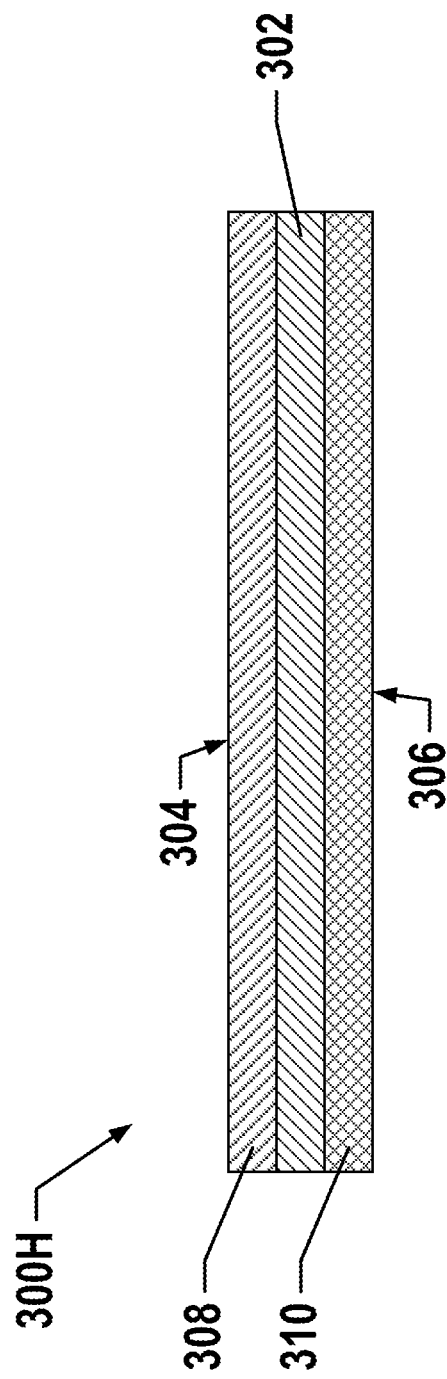
Figure 24:
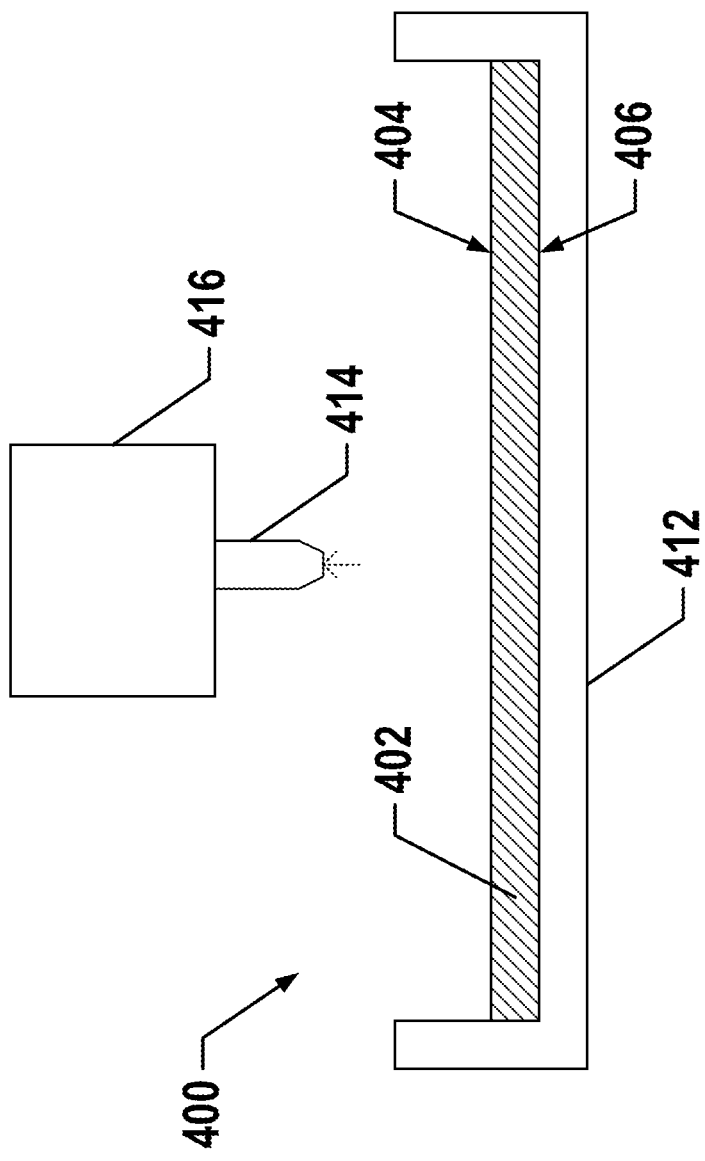
Figure 25:
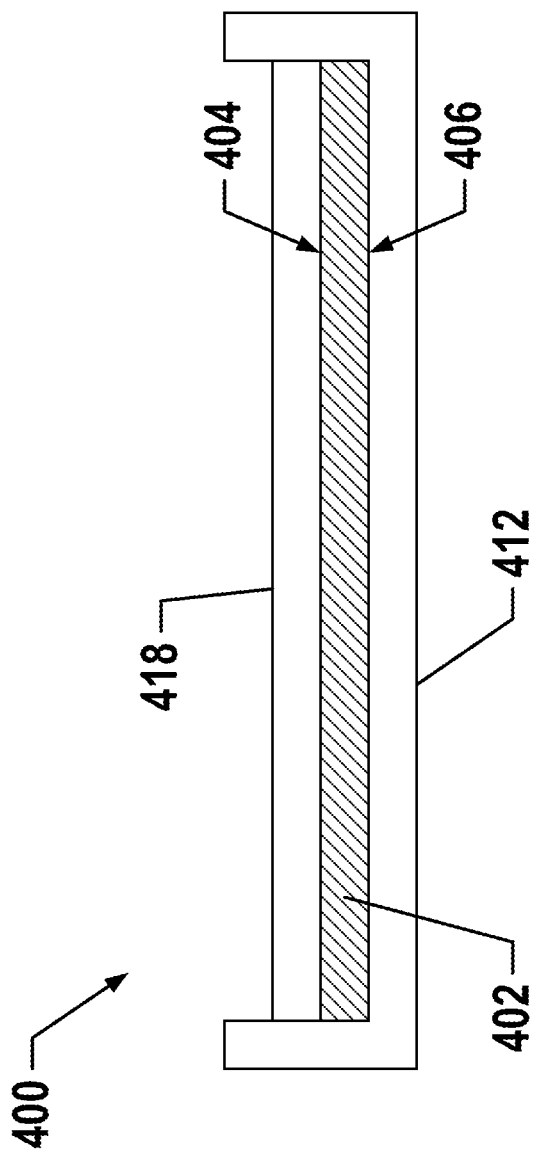
Figure 26:
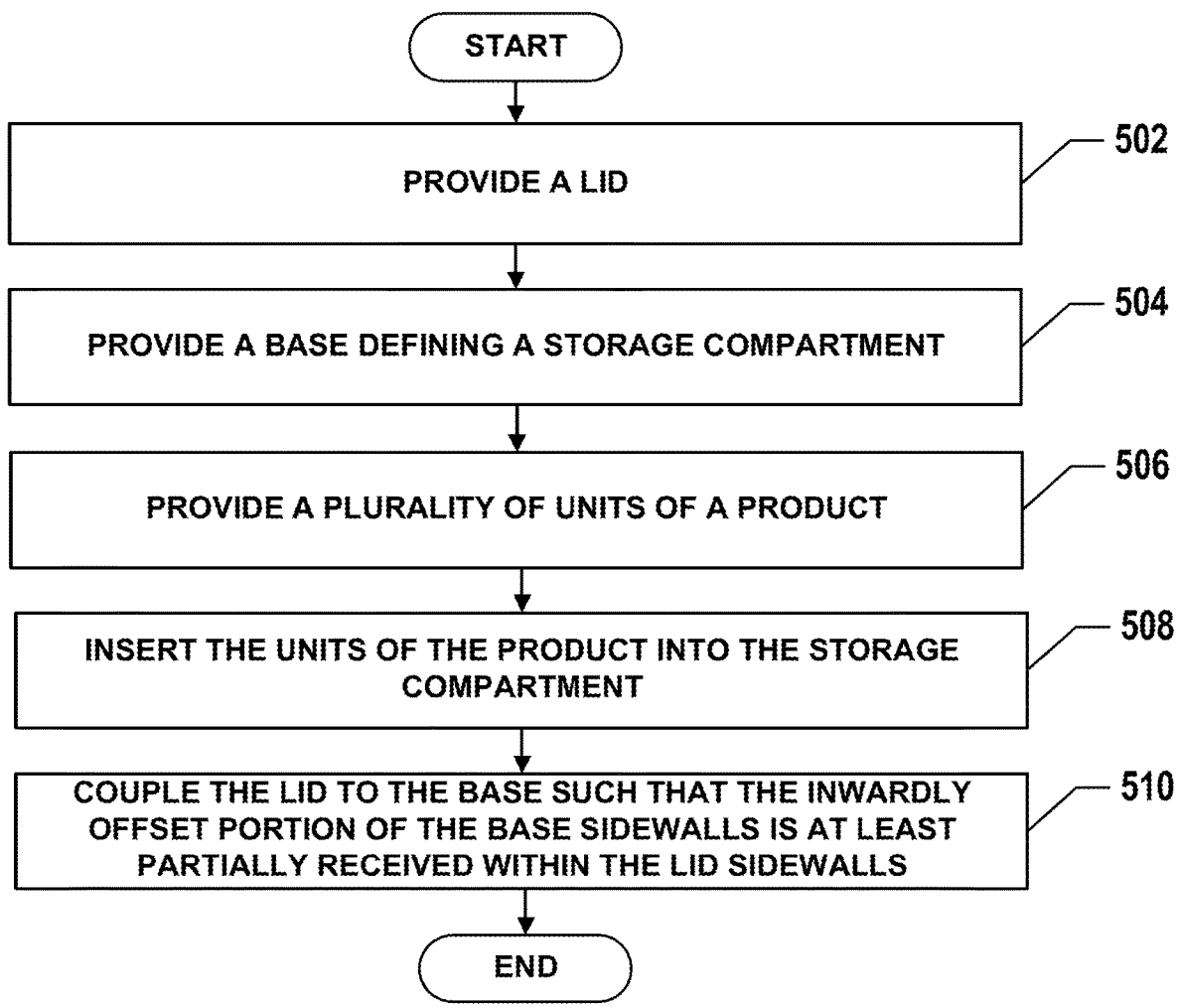
Figure 27:
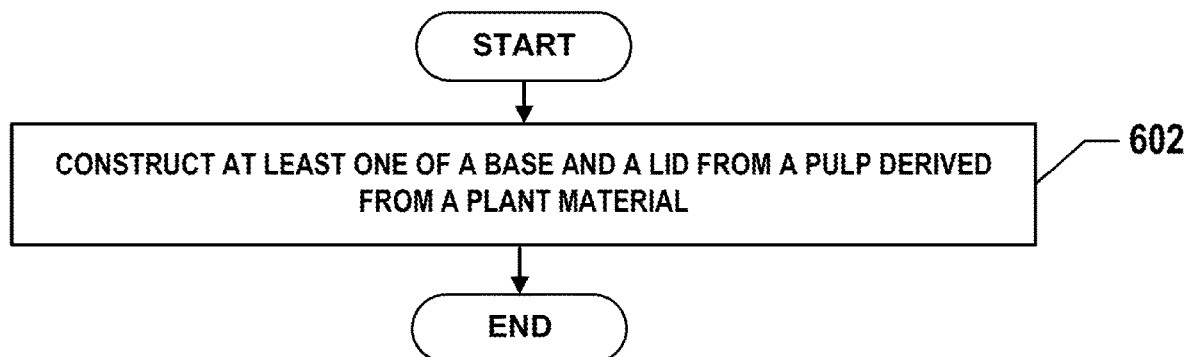

Having thus described the disclosure in general terms, reference will now be made to the accompanying drawings, which are not necessarily drawn to scale, and wherein:

FIG. 1 illustrates a perspective view of a container comprising a lid and a base in a coupled configuration according to an example embodiment of the present disclosure;

FIG. 2 illustrates a perspective view of the base of the container of FIG. 1;

FIG. 3 illustrates a top view looking into the inside of the base of the container of FIG. 1;

FIG. 4 illustrates a bottom perspective view of the lid of the container of FIG. 1;

FIG. 5 illustrates a top view of the lid of the container of FIG. 1;

FIG. 6 illustrates a bottom view looking into the inside of the lid of the container of FIG. 1;

FIG. 7 illustrates a sectional view through the container of FIG. 1 in the coupled configuration along line 7-7;

FIG. 8 illustrates a sectional view through the container of FIG. 1 in the coupled configuration along line 8-8;

FIG. 9 illustrates a container according to an embodiment of the present disclosure wherein the container defines a cylindrical configuration;

FIG. 10 illustrates a sectional view through the container of FIG. 9;

FIG. 11 illustrates a perspective view of a base of the container of FIG. 9;

FIG. 12 illustrates a sectional view through a container according to an example embodiment of the present disclosure wherein the container comprises a lid and a base, wherein the lid and the base are in a decoupled configuration according to an example embodiment of the present disclosure;

FIG. 13 illustrates a sectional view through the container of FIG. 12 wherein the lid and the base are in a coupled configuration;

FIG. 14 illustrates a sectional view through a container according to an example embodiment of the present disclosure wherein the container comprises a lid, a base, and a structural member, wherein the lid and the base are in a decoupled configuration according to an example embodiment of the present disclosure;

FIG. 15 illustrates a sectional view through the container of FIG. 14 wherein the lid and the base are in a coupled configuration;

FIG. 16 schematically illustrates a partial sectional view through a container comprising a pulp material according to an example embodiment of the present disclosure;

FIG. 17 schematically illustrates a partial sectional view through a container comprising a combined material according to an example embodiment of the present disclosure;

FIG. 18 schematically illustrates a partial sectional view through a container comprising a pulp material at an exterior and a liner at an interior according to an example embodiment of the present disclosure;

FIG. 19 schematically illustrates a partial sectional view through a container comprising a pulp material at an interior and a liner at an exterior according to an example embodiment of the present disclosure;

FIG. 20 schematically illustrates a partial sectional view through a container comprising a pulp material at an exterior and a coating at an interior according to an example embodiment of the present disclosure;

FIG. 21 schematically illustrates a partial sectional view through a container comprising a pulp material at an interior and a coating at an exterior according to an example embodiment of the present disclosure;

FIG. 22 schematically illustrates a partial sectional view through a container comprising a pulp material with a coating at an interior and an exterior according to an example embodiment of the present disclosure;

FIG. 23 schematically illustrates a partial sectional view through a container comprising a pulp material, a liner at an interior, and a coating at an according to an example embodiment of the present disclosure;

FIG. 24 schematically illustrates spraying a pulp material into a mold according to an example embodiment of the present disclosure;

FIG. 25 schematically illustrates compressing the pulp material in the mold of FIG. 24 with a moveable mold to form a container according to an example embodiment of the present disclosure;

FIG. 26 schematically illustrates a method for assembling a packaged product assembly according to an example embodiment of the present disclosure; and FIG. 27 schematically illustrates a method for forming a container according to an example embodiment of the present disclosure.

DETAILED DESCRIPTION OF THE DISCLOSURE

The present disclosure now will be described more fully hereinafter with reference to certain preferred aspects. These aspects are provided so that this disclosure will be thorough and complete, and will fully convey the scope of the disclosure to those skilled in the art. Indeed, the disclosure may be embodied in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

The embodiments of containers described in the present application can be used to store a variety of products, but are particularly well-suited for products designed for oral consumption. Exemplary consumable products that are often packaged in such containers include a wide variety of consumer products, including tobacco products in smokeless form.

Exemplary tobacco products include pelletized tobacco products (e.g., compressed or molded pellets produced from powdered or processed tobacco, such as those formed into the general shape of a coin, cylinder, bean, pellet, sphere, orb, strip, obloid, cube, bead, or the like), extruded or cast pieces of tobacco (e.g., as strips, films or sheets, including multilayered films formed into a desired shape), products incorporating tobacco carried by a solid substrate (e.g., where substrate materials range from edible grains to inedible cellulosic sticks), extruded or formed tobacco-containing rods or sticks, tobacco-containing capsule-like materials having an outer shell region and an inner core region, straw-like (e.g., hollow formed) tobacco-containing shapes, sachets or packets containing tobacco (e.g., snus-like products), pieces of tobacco-containing gum, and the like. Further, exemplary tobacco products include tobacco formulations in a loose form such as, for example, a moist snuff product. Exemplary loose form tobacco used with the containers of the present disclosure may include tobacco formulations associated with, for example, commercially available GRIZZLY moist tobacco products and KODIAK moist tobacco products that are marketed by American Snuff Company, LLC.

Exemplary smokeless tobacco compositions that can be packaged in the containers of the present disclosure are set forth in, for example, U.S. Pat. No. 1,376,586 to Schwartz; U.S. Pat. No. 3,368,567 to Speer; U.S. Pat. No. 4,513,756 to Pittman et al.; U.S. Pat. No. 4,606,357 to Dusek et al; U.S. Pat. No. 4,821,749 to Toft et al.; U.S. Pat. No. 5,167,244 to Kjerstad; U.S. Pat. No. 5,387,416 to White; U.S. Pat. No. 6,668,839 to Williams; and U.S. Pat. No. 7,810,507 to Dube et al.; U.S. Pat. Nos. 7,819,124, 8,469,036 and U.S. Pat. No. 8,627,828 each to Strickland et al.; and U.S. Patent Application Pub. No. 2008/0029116 to Robinson et al. Examples of tobacco-containing gum are set forth in U.S. Pat. No. 4,624,269 to Story et al.; U.S. Pat. No. 4,975,270 to Kehoe; and U.S. Pat. No. 4,802,498 to Ogren. Various manners or methods for packaging smokeless tobacco products are set forth in U.S. Patent Application Pub. Nos. 2004/0217024 and 2006/0118589 to Arnarp et al.; and 2009/0014450 to Bjorkholm; and PCT Pub. Nos. WO 2006/034450 to Budd; WO 2007/017761 to Kutsch et al.; and WO 2007/067953 to Sheveley et al. All of the above-cited references are incorporated by reference herein in their entirety.

Embodiments of containers for packaging products such as smokeless tobacco products including trays slidably received in housings are described in U.S. Pat. No. 7,946,450 to Gelardi et al.; U.S. Pat. No. 8,066,123 to Gelardi; U.S. Pat. No. 8,087,540 to Bailey et al.; U.S. Pat. No. 8,096,411 to Bailey et al.; and U.S. Patent Application Pub. Nos. 2011/0000931 to Gelardi et al. and 2010/0133140 to Bailey et al. U.S. Pat. No. 8,033,425 to Gelardi describes a hinged container for packaging products such as smokeless tobacco products. U.S. Pat. No. 6,736,261 to Thomas et al. and U.S. Pat. No. 7,014,039 to Henson et al. disclose metal containers for tobacco products with a sliding lid. U.S. Pat. No. 8,397,945 to Gelardi et al. describes a container for packaging products such as smokeless tobacco products including an outer casing and a dispensing tray. U.S. Pat. No. 8,540,113 to Bailey describes a container for packaging products such as smokeless tobacco products including a base and a lid configured to pivot and slide between open and closed positions. U.S. Patent Application Pub. No. 2012/0193265 to Patel et al. describes a container for packaging products such as smokeless tobacco products including a separable lid and base with vent channels. U.S. Patent Application Pub. No. 2014/0001194 to Pipes et al. discloses hinging containers with blister packs received therein. All of the above-cited references are incorporated by reference herein in their entirety.

Smokeless tobacco compositions utilized as the product contained in the containers of the present disclosure will often include ingredients such as tobacco (typically in particulate form), sweeteners, binders, colorants, pH adjusters, fillers, flavoring agents, disintegration aids, antioxidants, oral care additives, and preservatives. See, for example, U.S. Pat. No. 7,861,728 to Holton et al., which is incorporated by reference herein in its entirety.

The tobacco formulation can be contained within a container, such as a pouch or bag, such as is the type commonly used for the manufacture of snus types of products (e.g., a sealed, moisture permeable pouch that is sometimes referred to as a "portion"). A representative moisture permeable pouch can be composed of a "fleece" type of material. The tobacco formulation is in turn contained within a package, such as the containers of the present disclosure described more fully hereinbelow. The package is sealed, and is composed of a suitable material, such that the atmospheric conditions within that sealed package are modified and/or controlled. That is, the sealed package can provide a good barrier that selectively or non-selectively inhibits the passage of compositions such as moisture and oxygen therethrough. For example, the seal or gasket can be useful for inhibiting ingress of moisture while also allowing for egress of gas. In addition, the atmosphere within the sealed package can be further modified by introducing a selected gaseous species (e.g., nitrogen, argon, or a mixture thereof) into the package prior to sealing or by drawing a vacuum therein (vacuum sealing). As such, the atmospheric conditions to which the tobacco composition is exposed are controlled during conditions of one or more of preparation, packing, storage and handling.

An exemplary pouch may be manufactured from materials, and in such a manner, such that during use by the user, the pouch undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch and tobacco formulation each may undergo complete dispersion within the mouth of the user during normal conditions of use, and hence the pouch and tobacco formulation both may be ingested by the user. Other exemplary pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the tobacco formulation contents permeate through the pouch material prior to the time that the pouch undergoes loss of its physical integrity. If desired, flavoring ingredients, disintegration aids, and other desired components, may be incorporated within, or applied to, the pouch material.

Descriptions of various components of snus products and components thereof also are set forth in U.S. Patent Application Pub. No. 2004/0118422 to Lundin et al., which is incorporated herein by reference. See, also, for example, U.S. Pat. No. 4,607,479 to Linden; U.S. Pat. No. 4,631,899 to Nielsen; U.S. Pat. No. 5,346,734 to Wydick et al.; and U.S. Pat. No. 6,162,516 to Den, and U.S. Patent Application Pub. No. 2005/0061339 to Hansson et al.; each of which is incorporated herein by reference. See, also, the representative types of pouches, and pouch material or fleece, set forth in U.S. Pat. No. 5,167,244 to Kjerstad, which is incorporated herein by reference. Snus products can be manufactured using equipment such as that available as SB 51-1/T, SBL 50 and SB 53-2/T from Merz Verpackungmaschinen GmBH. G.D SpA out of Italy also supplies tobacco pouching equipment. Snus pouches can be provided as individual pouches, or a plurality of pouches and can be connected or linked together (e.g., in an end-to-end manner) such that a single pouch or individual portion can be readily removed for use from a one-piece strand or matrix of pouches.

Although example embodiments of containers are illustrated in the drawings and described herein, it should be understood that the shape of the containers of the disclosure can vary. For example, although the container embodiments illustrated in the drawings have certain contours, containers with other exterior surface designs could also be used. Further, the sides or edges of the containers of the disclosure could be flattened, rounded, or beveled, and the various surfaces or edges of the container exterior could be concave or convex. Further, the opposing sides, ends, or edges of the container can be parallel or non-parallel such that the container becomes narrower in one or more dimensions. Additionally, although the example embodiments of dimensions described herein are provided in order to achieve certain benefits, the dimensions may vary in other embodiments.

The number of solid product units stored in the containers of the disclosure can vary, depending on the size of the container and the size of the product units. Typically, the number of stored product units will vary from about 5 to about 100, more typically about 10 to about 50, and most often about 15 to about 30.

FIG. 1 illustrates a perspective view of a container 100 according to an example embodiment of the present disclosure. The container 100 may comprise a lid 102 and a base 104. The lid 102 and the base 104 may be configurable between a coupled configuration and a decoupled configuration. FIG. 1 illustrates the lid 102 and the base 104 in a coupled configuration in which the lid is coupled to the base. In the coupled configuration one or more units of a product may be stored therein. In one embodiment the product may be a smokeless tobacco product. In another embodiment the product may be selected from the group consisting of pharmaceutical products, smoking products, smokeless tobacco products, and consumable products. However, various other embodiments of products may be stored in the container 100.

The material of construction of the container 100 can vary. In a preferred embodiment, both the lid 102 and the base 104 are formed from a metallic material, such as tin, aluminum, steel, or tin coated steel plate. In this regard, as described below, plastisol or other heated fluid sealing members may be applied to the metal without causing damage thereto. In some embodiments the lid 102 and the base 104 may be respectively formed from a single sheet of metal via punching, stamping, trimming, forming the sheet of metal and/or via other operations. In one embodiment the metal may define a thickness from about 0.1 millimeters to about 0.3 millimeters, and in a preferred embodiment about 0.19 millimeters. This thickness may provide the container 100 with adequate structure and allow the container to operate as described herein.

Various other materials may be employed in other embodiments including for example, wood (e.g., embodied as a pulp material as described below) and synthetic plastic materials. Polymeric materials that can be extruded and/or molded into desired shapes may be utilized, such as polyethylene, polystyrene, polyamide, and the like. In one embodiment the base 104 may be formed from a polymeric material, while the lid 102 may be formed from a metallic material such as, for example, aluminum or tinplate. Such a configuration may be advantageous in that it may provide an aesthetically appealing appearance by using a metallic material to form the lid 102 (which is typically stamped), while also allowing the body to be less expensively produced using, for example, an injection molding process. Further, plastisol or other heated fluid sealing members may still be applied to the lid 102 in the manner described above.

The lid 102 and the base 104 may also be configured to a decoupled configuration in which the lid and the base are separated from one another. In this regard, FIG. 2 illustrates a perspective view of the base 104 and FIG. 3 illustrates a top view of the base. As illustrated, the base 104 may comprise a bottom wall 106 and one or more base sidewalls 108. The base sidewalls 108 may extend from the bottom wall 106 to an upper lip 110. The upper lip 110 may define a base opening 112 that provides access to an internal storage compartment 114. The internal storage compartment 114 may store one or more units of product therein in the coupled configuration (see, e.g., FIG. 1) and provide access to the units of product via the base opening 112 in the decoupled configuration (see, e.g., FIGS. 2 and 3) in which the internal storage compartment 114 is open.

The base sidewalls 108 may comprise an outer portion 116, which extends from the bottom wall 106. The base sidewalls 108 may further comprise an inwardly offset portion 118 and an angled portion 120. The angled portion 120 may extend from the inwardly offset portion 118 to the upper lip 110. The base sidewalls 108 may further comprise a shoulder portion 122 extending substantially perpendicularly to the outer portion 116 and the inwardly offset portion 118. The shoulder portion 122 may connect the outer portion 116 to the inwardly offset portion 118.

The inwardly offset portion 118 of the base sidewalls 108 may define one or more protrusions 124 projecting outwardly therefrom. The base sidewalls 108 may further comprise one or more recessed portions 126. Each recessed portion 126 may extend from the outer portion 116 to the inwardly offset portion 118. However, whereas the shoulder portion 122 of the base sidewalls 108 may extend substantially perpendicularly to the outer portion 116 and the inwardly offset portion 118, the recessed portion 126 may extend at an angle that is non-parallel and non-perpendicular to the outer portion and the inwardly offset portion. As described below, this configuration may allow the recessed portion 126 to provide a user with access to the lid 102 when the lid is coupled to the base 104.

FIGS. 4-6 illustrate the lid 102 of the container 100. In particular, FIG. 4 illustrates a perspective view of the lid 102, FIG. 5 illustrates a top view of the lid, and FIG. 6 illustrates a bottom view of the lid. As illustrated, the lid 102 may comprise a top wall 128 defining an inner surface 130. One or more lid sidewalls 132 may extend from the top wall 128 to a lower lip 134 defining a lid opening 136. Further, a sealing member 138 may extend around a perimeter of the top wall 128 at the inner surface 130 thereof.

In this regard, as illustrated in FIGS. 7 and 8, which are sectional views through the container 100 in the closed position along lines 7-7 and 8-8 in FIG. 1, the top wall 128 of the lid 102 may define a channel 140 at the inner surface 130 thereof in which the sealing member 138 may be at least partially received. The channel 140 may define a depth from about 0.5 millimeters to about 1 millimeters and/or a radius from about 1 millimeter to about 1.2 millimeters in some embodiments. In a preferred embodiment the channel 140 may define a depth of about 0.6 millimeters and define a radius of about 1.1 millimeters.

In one embodiment the sealing member 138 may be formed from a fluid that is directed into the channel 140, such that the channel is partially or completely full, in a fluid form and thereafter cured or otherwise transformed into a solid or semi-solid form (e.g., a gel). For example, the sealing member 138 may comprise plastisol that is directed into the channel 140 and cured therein via the application of heat. As the plastisol is heated, the plastisol may transfer from a fluid form to an air-filled gel matrix. During the transformation from fluid to air-filled gel matrix, the plastisol may expand outwardly from the channel 140. Accordingly, the above-noted dimensions of the channel 140 may be selected to result in a sealing member 138 defining desired dimensions.

In embodiments in which the sealing member 138 is applied to the lid 102 as a fluid and cured therein, the lid may comprise a material capable of being heating without suffering damage thereto. For example the lid 102 may comprise a metal such as tin, aluminum, steel, or tin coated steel plate. Wood containers (e.g., formed from a pulp material as described below) may also be capable of being heated without suffering damage. In contrast, embodiments of plastics and other materials having a melting point less than a temperature at which the plastisol is cured may not be employed to form the lid 102 in this embodiment, since the material may melt during the curing process.

Although the plastisol (or other fluid) is described above as being directed into the channel 140 to form the sealing member 138, in another embodiment the entirety of the inner surface 130 of the top wall 128 of the lid 102 may be coated with plastisol (or other fluid), which may then be cured to form a sealing member extending across the entirety of the inner surface of the top wall of the lid. In this embodiment, the channel 140 may be omitted from the top wall 128. However, this embodiment may employ more plastisol than is necessary, since sealing contact with the sealing member may only occur at specific locations, as will be described below, such that coating the inner surface 130 of the top wall 128 of the lid 102 may be more expensive and produce a container that is heavier than necessary.

Further, the sealing member 138 may comprise various other embodiments of materials. For example, the sealing member 138 may comprise rubber, plastic, or various other embodiments of elastomeric materials configured to form a seal. In particular, any material suitable for forming a resilient gasket can be used according to the present disclosure. These materials may be glued or otherwise coupled to the inner surface 130 of the top wall of the lid 102, rather than applied as a fluid and cured therein.

As illustrated in FIG. 5, an outer surface 142 of the top wall 128 of the lid 102 may comprise an outwardly protruding portion 144 at the channel 140, which may extend about the perimeter of the top wall. In this regard, the channel 140 may be stamped or formed at the top wall 128 of the lid 102 in some embodiments such that the top wall is concave at the inner surface 130 and convex at the outer surface 142. The outwardly protruding portion 144 of the top wall 128 at the channel 140 may provide a user with grip when holding the container 100.

As illustrated in FIGS. 7 and 8, the outwardly protruding portion 144 of the top wall 128 at the channel 140 may extend past a remainder of the lid 102 and collectively define a planar surface. Thus, the outwardly protruding portion 144 of the top wall 128 at the channel 140 may be employed to support the container 100 in a stable manner when the container is placed with the lid 102 down on a surface, and elevate the container 100 such that grasping and lifting the container off of the surface is facilitated.

When the lid 102 and the base 104 are moved from the decoupled configuration to the coupled configuration illustrated in FIGS. 1, 7, and 8, the angled portion 120 of the base sidewalls 108 may align the base 104 with respect to the lid 102 when the lid is placed on the base. In this regard, the angled portion 120 of the base sidewalls 108 may define an angle 146 with respect to the inwardly offset portion 118. Accordingly, the upper lip 110 of the base 104 may be received with clearance within the lid opening 136 to the lid 102 such that a degree of tolerance is provided with respect to the lower lip 134 when the lid and the base are moved into contact with one another during coupling therebetween. Thus, even when a user misaligns the lid 102 and the base 104, the angled portion 120 of the base sidewalls 108 may bring the base and the lid into alignment. Accordingly, movement of the lid 102 and the base 104 from the decoupled configuration to the coupled configuration may be facilitated.

Further, when the lid 102 and the base 104 are moved to the coupled configuration, the internal storage compartment 114 defined by the base may be closed. Further, in some embodiments the internal storage compartment 114 may be substantially sealed shut. In this regard, the upper lip 110 of the base 104 may contact and seal against the sealing member 138 of the lid 102 when the lid and the base are moved to the coupled configuration. The angle 146 defined by the angled portion 120 of the base 104 with respect to the inwardly offset portion 118 may be configured to position the upper lip 110 in contact with the sealing member 138 when the upper lip, the angled portion, and the inwardly offset portion are received through the lid opening 136. More particularly, the angle 146 defined by the angled portion 120 may be configured to center the upper lip 110 of the base 104 with respect to the channel 140 and/or the sealing member 138.

In one embodiment the angle 146 of the angled portion 120 of the base sidewalls 108 may be from about thirty-five degrees to about forty degrees. In a preferred embodiment the angle 146 of the angled portion may be about 38.3 degrees. Use of these values for the angle 146 may provide the container 100 with a more compact form as compared to embodiments of containers defining a substantially straight base sidewall extending substantially perpendicular to a lid when coupled therewith. The above-noted values of the angle 146 may provide a desirable balance between reducing the overall height of the container 100 and providing a sufficient volume of the internal storage compartment 114 for storage of units of product therein. Note that the angled portion 120 of the base sidewalls 108 may also bend inwardly toward the internal storage compartment 114. In this regard, the base sidewalls 108 may define an equal thickness at each of the portions thereof. For example, in one embodiment the base 104 and/or the lid 102 may be formed from single pieces of material (e.g., metal) that is stamped, bent, and/or otherwise manipulated to form the container 100. By forming the angled portion 120 of the base sidewalls 108 such that it extends inwardly, the angled portion may define an overhang that facilitates scooping or otherwise engaging a unit of the product stored in the internal storage compartment 114 with a user's fingers.

The upper lip 110 may be configured to define a substantially airtight seal with the sealing member 138 such that the internal storage compartment 114 is sealed shut when the lid 102 and the base 104 are in the coupled configuration. In order to form this seal, the upper lip 110 may be continuous around the perimeter of the base opening 112 and define a constant cross-section. Accordingly, no gaps may be created between the sealing member 138 and the upper lip 110. Further, the upper lip 110 may be rounded. In this regard, the upper lip 110 and/or the lower lip 134 may comprise a rolled edge, as illustrated in FIGS. 7 and 8. The upper and/or lower lips 110, 134 may be formed by rolling or bending the material defining the lid and base sidewalls 132, 108 at the distal end thereof. By providing the upper lip 110 and/or the lower lip 134 with a rounded shape, the possibility of injury associated with a user contacting the lips may be reduced. Further, providing the upper lip 110 with a rounded configuration may facilitate engagement with the sealing member 138. In this regard, by rolling, bending, or otherwise transforming or forming an otherwise straight edge of the material defining the base 104 into the rounded upper lip 110, the upper lip may define a greater surface area such that the upper lip may be more likely to form a seal with the sealing member 138 when the lid 102 is coupled to the base 104.

However, the radius of the channel 140 may be greater than radius of the upper lip 110. In this regard, when the channel 140 defines a relatively greater radius than the upper lip 110, a sealing member 138 formed therein (e.g., by curing plastisol therein) may also define a greater radius (or other relatively larger dimensions) as compared to the upper lip. Providing the upper lip 110 with smaller dimensions as compared to the sealing member 138 may allow the upper lip 110 to compress into and be at least partially surrounded by the sealing member 138. Accordingly, a relatively more secure seal may be provided. In one embodiment the upper lip 110 may define a radius from about 0.7 millimeters to about 0.8 millimeters and in a preferred embodiment the radius may be about 0.75 millimeters. In some embodiments the channel 140 may define a radius from about 1 millimeter to about 1.2 millimeters, and in a preferred embodiment the radius may be 1.1 millimeters. However, various other radii may be employed in other embodiments.

In order to retain coupling between the lid 102 and the base 104, the container may include certain features. In this regard, as illustrated in FIG. 8, the protrusions 124 extending from the base sidewalls 108 may be configured to engage the lower lip 134 of the lid 102 via interference fit. Accordingly, interference between the protrusions 124 and the lower lip 134 may resist separation of the lid 102 from the base 104 when the lid and the base are in the coupled configuration.

In one example embodiment the container 100 may be configured such that from about 500 grams-force to about 2000 grams-force is required to decouple the lid 102 from the base 104. Decoupling forces within this range may be desirable because they may provide a satisfying degree of resistance while still allowing for relatively easy decoupling of the lid 102 and the base 104. In some embodiments the selected decoupling force may also provide child resistance.

In order to achieve a desired required decoupling force, various factors may be adjusted. In this regard, a protruding length to which the protrusions 124 protrude perpendicularly from the inwardly offset portion 118 may be controlled. Further, a width 148 of the protrusions 124 and a height 150 of the protrusions may be adjusted (see, e.g., FIG. 7). In some embodiments the protrusions 124 may define a width 148 that is greater than the height 150 of the protrusions. This configuration may provide for an increased area of contact between the protrusions 124 and the lower lip 134 that may increase the decoupling force required to decouple the lid 102 from the base 104.

In one embodiment the height 150 of the protrusions 124 may be from about 2 millimeters to about 2.2 millimeters, and in a preferred embodiment the height may be about 2.1 millimeters. Further, the lower lip 134 of the lid 102 may define a radius from about 0.7 millimeters to about 1 millimeter, and in a preferred embodiment the radius of the lower lip may be about 0.85 millimeters. Additionally, the protrusions 124 may define a protruding length protruding outwardly from the inwardly offset portion 118 of the base sidewalls 108 from about 0.4 millimeters to about 0.6 millimeters, and in a preferred embodiment the protruding length of the protrusions may be about 0.5 millimeters. Selection of the above-noted dimensions may be configured to produce a decoupling force required to separate the lid 102 from the base 104 in the range described above.

The protrusions 124 may also be configured to bias the upper lip 110 of the base 104 into contact with the sealing member 138 on the lid 102. In this regard, engagement between the protrusions 124 and the lower lip 134 may be configured to bias the upper lip 110 against the sealing member 138. Accordingly, a tight seal may be formed between the upper lip of the base 104 and the sealing member 138 of the lid 102 when the container 100 is in the coupled configuration.

In the coupled configuration the shoulder portion 122 of the base sidewalls 108 may be configured to define a gap 152 with respect to the lower lip 134 of the lid sidewalls 132 when the lid 102 and the base 104 are configured in the coupled configuration. In this regard, by providing the gap 152, the lower lip 134 of the lid 102 may have room to bias downwardly due to contact with the protrusions 124. Accordingly, the gap 152 provided by the placement of the shoulder portion 122 may allow the upper lip 110 of the base 104 to seal against the sealing member 138 of the lid 102 as described above.

Note that use of interference fit to hold the lid 102 and the base 104 together may be desirable as compared to other retention methods. In this regard, by way of example, a threaded connection between a base and a lid may produce a seal that is dependent on the extent to which the lid and the base are threaded together. In contrast, in the present embodiment, once the lower lip 134 of the lid 102 extends past the protrusions 124, the lip and the lid may be held together by a force that is independent of the closing force imparted thereon by a user. Thus, for example, the container 100 may not be over or under tightened. Thereby, a desirable seal may be attained, and the decoupling force required to separate the lid 102 from the base 104 may be consistent.

The recessed portions 126 may be configured to align with the lower lip 134 of the lid sidewalls 132 of the lid 102 when the lid and the base 104 are configured in the coupled configuration. Thus, the recessed portions 126 may provide a user with access to the lower lip 134 of the lid 102 in the coupled configuration such that the lid may be decoupled from the base 104. In some embodiments the recessed portions 126 may be positioned such that they are not vertically aligned with the protrusions 124. Thus, when a user grasps the lower lip 134 at the recessed portions 126 and lifts the lid 102 from the base 104, the users fingers may avoid contacting the protrusions 124, which could otherwise potentially impede decoupling of the lid from the base. In the example embodiment, as illustrated in FIG. 7, the recessed portions 126 may be positioned between pairs of the protrusions 124, although various other configurations may be employed. Further, although described as extending from the inwardly offset portion 118, the protrusions may extend from other portions of the base sidewalls 108 or other portions of the container 100 in other embodiments.

In the illustrated embodiment, the container 100 defines a generally rectangular shape with rounded ends. This shape may allow for placement of the protrusions 124 and the recessed portions 126 on the long sides of the base 104. This configuration may be preferable in that it may allow a user to firmly grip the recessed portions 126. However, various other shapes and configurations (e.g., round or square) of the container may be employed in other embodiments.

By way of example, FIG. 9 illustrates an embodiment of a container 200 that is generally cylindrical. The container 200 may include a lid 202 and a base 204, which may be configurable between coupled and decoupled configurations. Thus, the circular shape (when viewed from above or below) provides the container 200 with an alternate configuration which may be preferable to consumers in some embodiments. As may be understood, various sizes, shapes, and configurations may be employed in other embodiments, depending on consumer preferences and other factors.

FIG. 10 illustrates a sectional view through the container 200. As illustrated, the lid 202 may include a top wall 228 and one or more lid sidewalls 232 extending from the top wall to a lower lip 234 defining a lid opening 236. The base 204 may include a bottom wall 206 and one or more base sidewalls 216 extending from the bottom wall to an upper lip 210 defining a base opening 212 (see, FIG. 11).

The lid 202 may be configured to engage the base 204 via any of a variety of mechanisms, such as a threaded connection or interference fit. As illustrated, in one embodiment the base 204 may define an outer protrusion 238 at the base sidewalls 216, which may extend around the perimeter of the base, and the lid 202 may define a corresponding inner recesses 240 extending around the inside thereof. Thereby, the outer protrusion 238 of the base 204 may engage the inner recess 240 of the lid 202. As may be understood, in an opposite configuration the lid may define an inner protrusion that engages an outer recess in the base. In an additional embodiment the base and the lid may each define a respective recess, and a gasket (e.g., an O-ring) may be received in the recess in the base and configured to engage the lid to provide for engagement and optional sealing therebeween. Containers including gaskets configured to seal the connection between a lid and a base are disclosed, for example, in U.S. Pat. No. 8,458,996 to Bried et al. and U.S. Pat. No. 8,910,781 to Pipes et al., which are incorporated herein by reference in their entireties. In another embodiment the container may include a gasket a sidewall of the base as disclosed, for example, in U.S. patent application Ser. No. 14/663,987 to Patel et al., which is incorporated herein by reference in its entirety.

As further illustrated in FIG. 10, in some embodiments the container 200 may include an intermediate wall 254. In the illustrated embodiment the base 204 includes the intermediate wall 254. However, the lid 202 may include an intermediate wall in other embodiments. The intermediate wall 254 may divide an internal space 256 defined by the base 204 into an internal storage compartment 214 and a secondary compartment 258.

The internal storage compartment 214 may be configured to receive a plurality of units of a product 260. In some embodiments the product may be selected from the group consisting of pharmaceutical products, smoking products, smokeless tobacco products, and consumable products. In this regard, each of the containers described herein may include these or other products in some embodiments.

Further, the secondary compartment 258 may be configured to receive an environment modification material 262 in the secondary compartment 258 between the intermediate wall 254 and a bottom wall 206 of the base 204. The environment modification material 262 may be configured to affect the atmosphere within the internal space 256 and in particular within the internal storage compartment 214 in which the units of the product 260 are positioned. For example, the environment modification material 262 may be configured to control a humidity level in the internal space 256, affect gas levels therein, provide or remove scents, or perform other functions. In this regard, the intermediate wall 254 may allow for fluid flow therethrough. For example, the intermediate wall 254 may include apertures 264 extending therethrough, wherein the apertures are configured to resist clogging by the units of the product 260 and/or movement of the units of the product therethrough due to the apertures defining an appropriately small size. Various other details with respect to environment modification materials and intermediate walls are provided in U.S. Pat. App. Pub. No. 2015/0136618 to Patel et al., which is incorporated herein by reference in its entirety.

The container 200 may additionally include a valve assembly 266. The valve assembly 266 may be configured to affect an atmosphere within the internal space 256. The valve assembly 266 may be engaged with the lid 202 or the base 204. In this regard, in the illustrated embodiment the valve assembly 266 is engaged with (e.g., coupled to or embedded within) the base 204 of the container 200. In particular, in the illustrated embodiment the valve assembly 266 is engaged with the bottom wall 206 of the base 204. However, in another embodiment the valve assembly 266 may be additionally or alternatively engaged with (e.g., coupled to or embedded within) the one or more base sidewalls 216. Regardless, by coupling the valve assembly 266 to the base 204, the valve assembly may be in fluid communication with both the internal space 256 within the container 200 and an external environment surrounding the container.

Accordingly, the valve assembly 266 may affect the atmosphere within the internal space 256 so as to facilitate storage of the units of the product 260 therein. For example, the valve assembly 266 may be configured to vent the internal space 256. Thereby, the valve assembly 266 may release pressure from the internal space 256 to avoid issues with respect to the container 200 bulging or otherwise deforming or breaking as a result of gas buildup therein.

Further, venting of the internal space 256 may avoid issues with respect to the container 200 releasing gas defining an undesirable odor at the time of opening the container. Various other details with respect to containers including valve assemblies are provided in U.S. patent application Ser. No. 14/515,598, filed Oct. 16, 2014, to Potter et al., which is incorporated herein by reference in its entirety.

Although the base 204 is described above as including the valve assembly 266, in some embodiments the lid 202 and/or the base may include additional or alternative features configured to affect the atmosphere within the internal space 256. In this regard, as illustrated in FIG. 11, in some embodiments the base 204 may include a rib structure 268. The rib structure 268 may project from an outer peripheral surface 270 of the base 204 at an upper portion 272 of the one or more base sidewalls 216.

In some embodiments, the rib structure 268 may be integrally formed with the one or more base sidewalls 216. In other instances, the rib structure 268 may be a separate and discrete component secured or otherwise affixed to the one or more base sidewalls 216 with appropriate mechanical fasteners or adhesive (e.g., an epoxy adhesive).

The rib structure 268 may be configured to allow for venting of the internal storage compartment 214. In this regard, the rib structure 268 may comprise a plurality of rib segments 274 arranged in spaced relation around the periphery of the one or more base sidewalls 216 (e.g., positioned circumferentially about the one or more base sidewalls when the container 200 is cylindrical). Any number of the rib segments 274 may be provided in accordance with the present disclosure (e.g., often about 2 to about 20 rib segments, and frequently about 5 to about 15 rib segments), although a preferred embodiment includes about 8 to about 12 rib segments. Each rib segment 274 may include a rib wall 276 projecting outwardly from the one or more base sidewalls 216 and a rib projection 278 projecting outwardly from the rib wall.

Exemplary dimensions for the rib projections 278 include heights in the range of about 0.05 millimeters to about 0.25 millimeters, and widths in the range of about 1 millimeter to about 1.5 millimeters. As used herein in reference to the rib projections 278, height refers to the major dimension of the rib projection that extends outwardly, away from the peripheral surface 270. The rib projections 278 may be positioned below the upper lip 210 of the one or more base sidewalls 216 in the range of about 1.5 millimeters to about 2.0 millimeters below the upper lip.

Each rib segment 274 is separated from an adjacent rib segment by a vent channel 280. Exemplary dimensions for the vent channels 280 include lengths in the range of about 6.9 millimeters to about 7.2 millimeters, and depths in the range of about 0.1 millimeters to about 0.2 millimeters. The vent channels 280 may extend from the upper lip 210 of the one or more base sidewalls 216 downwardly past the rib segments 274 to a shoulder 282. In this regard, a plurality of bumps or protrusions 284 may be positioned on the upper lip 210 of the base 204. Thereby, the protrusions 284 may separate the lid 202 (see, e.g., FIG. 9) from the upper lip 210 of the base 204 such that air may flow therebetween and through the vent channels 280. Such vent channels 280 provide venting when the lid 202 (see, e.g., FIG. 9) is fully seated on the base 204, such that issues with respect to gas build-up within the internal storage compartment 214 are avoided. Thus, the vent channels 280 may be provided as an alternative to, or in addition to the valve assembly 266 (see, FIG. 10). Various other details with respect to embodiments of rib structures and venting arrangements are provided in U.S. Pat. Pub. Nos. 2012/0193265 and 2015/0136618 to Patel et al., which are incorporated herein by reference.

As may be understood, the features defined by the containers 100, 200 illustrated in FIGS. 1-11 need not be included in each embodiment of the containers of the present disclosure. In this regard, the various features of the containers 100, 200 are optional, and may be considered as being aspirational in nature. In other embodiments containers of the present disclosure may be relatively less complex. As discussed below, the containers of the present disclosure may comprise materials not traditionally employed in containers. Accordingly, usage of relatively less complex configurations may facilitate formation of the containers from such materials.

For example, FIGS. 12 and 13 illustrate a container 200' according to an additional example embodiment of the present disclosure. In some embodiments the container 200' may define a substantially cylindrical configuration. Accordingly, the container 200' may define an exterior appearance that is substantially similar to that of the container 200 (see, e.g., FIG. 9). However, as may be understood, the container may define other configurations (e.g., oblong, square, triangular, oval, rectangular, elongated, etc.) in other embodiments, such that, for example, the exterior appearance of the container is substantially similar to that of the container 100 (see, e.g., FIG. 1).

The container 200' may include a lid 202' and a base 204'. The lid 202' and the base 204' may be configurable between coupled and decoupled configurations. The decoupled configuration is illustrated in FIG. 12, and the coupled configuration is illustrated in FIG. 13, wherein these figures illustrate sectional views through the container 200'.

The container 200' may define a relatively less complex structure as compared to the embodiments of the containers 100, 200 illustrated in FIGS. 1-11. For example, although the container 100 described above includes the protrusions 124, the recessed portions 126, a sealing member 138, and the upper and lower lips 110, 134, some or all of these features may not be included in the container 200' in some embodiments. Further, although the container 200 described above includes the intermediate wall 254 and the rib structure 268, some or all of these features may not be included in the container 200' in some embodiments. Accordingly, the container 200' may define a relatively less complex configuration that may simplify the formation thereof.

As noted elsewhere herein, the containers of the present disclosure may be formed from alternative materials not traditionally employed therein. In some embodiments such materials may define sufficient structural rigidity so as to be self-supporting. However, in other embodiments the containers may include one or more additional components configured to provide structural rigidity to the containers or perform other functions.

In this regard, FIGS. 14 and 15 illustrate sectional views through an embodiment of a container 200" according to an additional embodiment of the present disclosure. The container 200" may be substantially similar to the container 200' described above. The container 200" may include a lid 202" and a base 204". However, as illustrated in FIGS. 14 and 15, the container 200" may additionally include a structural member 242". The structural member 242" may extend around an inner surface or an outer surface of the lid 202" or the base 204". For example, in the illustrated embodiment the structural member 242" extends around the inner surface of the base 204". In embodiments in which the structural member 242" extends around the inner surface of the lid 202" or the base 204", the outer surfaces of the lid and the base may be flush with one another so as to provide the container 200' with a pleasing integral appearance. The structural member 242" may define an annular configuration in embodiments of the container 200" in which the container 200" is cylindrical.

In some embodiments the structural member 242" may extend outwardly from the lid 202" or the base 204" such that a portion thereof is exposed. The exposed portion of the structural member 242" may be configured to releasably engage one of the base 204" and the lid 202". A remaining portion of the structural member 242" may be permanently coupled to the other of the lid 202" and the base 204". For example, in the illustrated embodiment the structural member 242" is affixed (e.g., adhered, glued, or otherwise permanently coupled) to the base 204" and configured to releasably engage the lid 202". In this regard, the structural member 242" may be configured to seal against the lid 202" when engaged therewith. In some embodiments the structural member 242" may comprise a material that is relatively rigid, such as plastic or metal.

As noted above, the containers of the present disclosure may be filled with one or more units of a product. As part of the final packaging process, once each container is filled with the one or more units of a product, the container may be sealed with a circumferential label or wrapper of a pervious or impervious material. In one embodiment a tamper evident shrink band may be wrapped and shrunken around the container such that the lid and the base may not be decoupled without damaging the shrink band. The label or wrapping material useful in accordance with the present disclosure can vary. Typically, the selection of the packaging label or wrapper is dependent upon factors such as aesthetics, tamper resistance and/or indication, desired barrier properties (e.g., so as to provide protection from exposure to oxygen, or so as to provide protection from loss of moisture), or the like.

In some embodiments, the lid and/or the base (or a portion thereof, such as the intermediate wall) of the containers disclosed herein may comprise, consist essentially of, or consist of, a pulp derived from a plant material. In one embodiment the lid may comprise a metal material or a plastic material and the base may comprise the pulp derived from the plant material, or vice versa. In another embodiment the lid and the base may each comprise the pulp derived from the plant material.

The pulp derived from the plant material may be produced by grinding, steaming, pressurizing, heating, or otherwise processing plant material. Examples of plants and plant materials from which the pulp may be derived include corn, cornstalks, bamboo, bamboo stalks, flax, flax fiber, hemp, hemp pulp, tobacco, grains, wood, wood pulp (e.g., hard or soft), and etc. Further, the pulp derived from the plant material may include one or more of various other materials such as filers, calcium carbonate, colorants, dye pigments, binders, glossy materials, calcium sulfate fibers, glass fibers, carbon fibers, and ceramics.

Various types of wood may be employed, and the type of wood selected may depend on the desired characteristics thereof. For example, each type of wood may define a differing color, differing strength, differing aroma, and/or other characteristics. In some embodiments the wood may comprise an aromatic wood such as cedar, pine, balsam, oak, pinon, fir, juniper, sandalwood, rose wood, moon beam, etc. Aromatic woods may affect the flavor and/or aroma of the units of the product in the container. Various other details with respect to the pulp material and molds configured to mold pulp material are disclosed in U.S. Pat. No. 7,077,933 to Otani et al. and U.S. Pat. No. 5,356,518 to Kelley et al; English Pat. Pubs. GB 501224 A and GB 461372 A; and PCT Appl. Pub. WO 2012/139590 A1 to Meincke et al., each of which is incorporated herein by reference in its entirety. Further, PCT Appl. Pub. WO 2008/020768 to Squire et al. discloses a composite material which may comprise wood fiber and which employs a liquid binder using waste coating powder together with a water-based acrylic paint, which is incorporated herein by reference in its entirety.

Usage of pulp derived from the plant material may provide certain benefits in addition to those noted above. In this regard, pulp derived from the plant material may be biodegradable. Further, pulp derived from the plant material, and in particular wood pulp material, may provide the container with the appearance of a wood product such as a solid piece of wood, which may be desirable to consumers. Pulp derived from the plant material refers to a formulation (e.g., mixture) incorporating plant material, and preferably wherein the plant material is the majority of the weight of the pulp. Similarly, wood pulp material, as used herein refers to a formulation (e.g., mixture) incorporating wood material (e.g., wood pulp and/or wood fibrous material), and preferably wherein the wood material is the majority of the weight thereof.

Note that while the pulp derived from the plant material is generally described herein as comprising a wood pulp material, various other materials may be employed in other embodiments. For example, in some embodiments the pulp derived from the plant material may comprise a tobacco pulp material. Embodiments of methods for processing tobacco plant material, and the resultant tobacco pulp material, are disclosed in U.S. Pat. Appl. Pub. No. 2013/0276801 to Byrd, Jr. et al., which is incorporated herein by reference in its entirety.

FIG. 16 schematically illustrates a sectional view through a portion of a container 300A (e.g., a lid or base thereof) wherein the container comprises a pulp derived from a plant material 302. As illustrated, in some embodiments the container 300A may be formed substantially entirely from the pulp derived from the plant material 302. Thus, the pulp derived from the plant material 302 may extend between, and define, an interior 304 and an exterior 306 of the container 300A. In this regard, the pulp derived from the plant material 302 (e.g., wood pulp material) may define sufficient strength so as to not require additional structural elements. Exemplary wall thicknesses of the container 300A may range from about 0.5 mm to about 1.5 mm, and more typically from about 0.8 mm to about 1.4 mm. In another embodiment the wall thicknesses may be double or triple these ranges in order to provide the container 300A with increased structural integrity and rigidity. Such wall thicknesses may also be applicable to each of the other containers described herein.

However in other embodiments of the container additional materials may be employed. For example, although the pulp derived from the plant material 302 may provide sufficient structural integrity, in some embodiments such a material may not provide fluid barrier properties. In this regard, it may be desirable to provide the container with a moisture transfer barrier and/or an air flow barrier, for example, in order to prevent a product such as tobacco material stored therein from drying out.

For example, FIG. 17 illustrates a container 300B comprising a combined material 303. The combined material 303 may include the pulp derived from the plant material 302 and one or more additional materials that may be combined in any manner therewith. For example, the materials may be mixed together, or one of the materials may be imbedded in the other.

By way of example, the pulp derived from the plant material 302 may be combined with one or more waxes (e.g., beeswax, Chinese, lanolin, shellac, spermaceti, bayberry, carnauba, candelilla, castor, esparto, Japan, jojoba, ouricury, rice bran, soy, tallow tree, ceresin, montan, ozocerite, peat, paraffin, microcrystalline, petroleum jelly, polyethylene wax, Fischer-Tropsch, esterified, saponified, substituted amide, and polymerized α-olefins) and/or one or more resins (e.g., mastic, pitch, and polyresin). Such materials added to the pulp derived from the plant material 302 to form the combined material 303 may provide the container 300B with moisture and/or air barrier properties. In one example embodiment a polymer may be dissolved in an acetone solvent, and infused in the pulp derived from the plant material 302. When the acetone evaporates, the polymer may remain infused with the pulp derived from the plant material 302 and form the combined material 303. In another embodiment a material in particulate form such as polyethylene or polypropylene may be dispersed in the pulp derived from the plant material 302 and then heated to form the combined material 303. By way of further example, FIG. 18 illustrates a container 300C comprising the pulp derived from the plant material 302 and a liner 308. The liner 308 may define moisture and/or air barrier properties. In some embodiments the liner 308 may be relatively thin. For example, the liner 308 may define a thickness of less than about one mil (one thousandth of an inch; 0.0254 mm).

The liner 308 may be formed in various manners. For example, the liner 308 may be formed in place, formed prior to attachment to the pulp derived from the plant material 302, thermoformed, injection molded, etc. In some embodiments the liner 308 may be coupled to the pulp derived from the plant material 302 via interference fit. However, in other embodiments connectors and/or an adhesive may be employed to retain engagement between the liner 308 and the pulp derived from the plant material 302. In some embodiments the liner may comprise, by way of example, plastic, aluminum, tin, a polymer resin, polyethylene (e.g., high or low density), polypropylene, nitrocellulose, polyvinylidene, acrylonitrile butadiene styrene (ABS), and/or polyvinyl alcohol (PVA).

As illustrated in FIG. 18, in one embodiment the liner 308 may be positioned at the interior 304 of the container 300C. In this regard, the liner 308 may be configured to protect the units of the produce received in the container 300C and/or provide the container with additional support and structure, whereas the pulp derived from the plant material 302 may be positioned at the exterior 306 of the container. Thereby, for example, when a user views the exterior 306 of the container 300C, the container may appear to define one or more solid pieces of wood.

However, as illustrated in FIG. 19, in another embodiment of a container 300D, the liner 308 may be positioned at the exterior 306, and the pulp derived from the plant material 302 may be positioned at the interior 304. This configuration may be desirable in that the units of the product are exposed to the pulp derived from the plant material 302 so as to receive the aroma, flavor, or other sensory characteristics therefrom. Further, the pulp derived from the plant material 302 may be visible to a consumer when the container 302 is opened, such that the interior 304 is exposed.

FIG. 20 illustrates an alternate embodiment of a container 300E, wherein the container includes a coating 310. The coating 310 may be applied as a spray, via immersion, applied via a role, or in any other manner. In some embodiments the coating 310 may comprise, by way of example, a varnish, a paint, a wax (e.g., beeswax, Chinese, lanolin, shellac, spermaceti, bayberry, carnauba, candelilla, castor, esparto, Japan, jojoba, ouricury, rice bran, soy, tallow tree, ceresin, montan, ozocerite, peat, paraffin, microcrystalline, petroleum jelly, polyethylene wax, Fischer-Tropsch, esterified, saponified, substituted amide, and polymerized α-olefins), paper-type coatings, polyvinylidene chloride (PVDC), nitrocellulose (e.g., in solution form with an alcohol or an acetate), vinyl acetate (e.g., in wax form), polyvinyl alcohol (PVA), polyethylene, a sealant, or anything configured to form a film. Example embodiments of commercially available coatings that may provide moisture resistance include Durata® finishes available from The Grothouse Lumber Company of Germansville, Pa. As illustrated, the coating 310 may be positioned at the interior 304 of the container 300E in some embodiments. This configuration may provide the exterior 306 of the container 300E with a natural wood finish and appearance, while the coating 310 provides additional moisture resistance to protect the units of the product or performs other functions.

In an alternate embodiment, as illustrated in FIG. 21, a container 300F may include the coating 310 at the exterior 306. This configuration may allow the coating 310 to perform sealing or other functions as noted above at the exterior 306 of the container 300F. However, in some embodiments the coating 310 may be positioned at the exterior 306 of at least one of the lid and the base and not positioned at an interior of the lid and the base. In other words, in one embodiment the coating 310 may be positioned at the exterior of the lid, but not at the interior of the lid. Alternatively or additionally, in some embodiments the coating 310 may be positioned at the exterior of the base, but not the interior of the base. Thereby, the units of the product may be exposed to the pulp derived from the plant material 302 at the interior 304, such that the units of the product may receive flavor, aroma, or other sensory characteristics from the pulp derived from the plant material.

In a further embodiment, as illustrated in FIG. 22, a container 300G may include the coating 310 at both the interior 304 and the exterior 306, with the pulp derived from the plant material 302 positioned therebetween. Thereby, for example, the coating 310 may substantially entirely surround the pulp derived from the plant material 302 such that the pulp derived from the plant material is enclosed. However, the coating 310 may be transparent or translucent such that the pulp derived from the plant material 302 is visible in some embodiments, so as to provide the container with a solid wood-like appearance.

Further, the pulp derived from the plant material, the liner, and the coating may be combined in any manner in other embodiments. For example, FIG. 23 illustrates a container 300H including the pulp derived from the plant material 302, the liner 308, and the coating 310. In the illustrated embodiment, the liner 308 is positioned at the interior 304, the coating 310 is positioned at the exterior 306, and the pulp derived from the plant material 302 is positioned therebetween. However, these elements may be configured in various other manners, optionally including additional layers or elements, in other embodiments. For example, although the coating 310 is illustrated as being applied to the pulp derived from the plant material 302, in other embodiments the coating may be additionally or alternatively applied to the liner 308.

The containers of the present disclosure may be formed in any of various manners. However, by way of example, FIG.

24 schematically illustrates the formation of a container 400 comprising a pulp derived from a plant material 402. As illustrated, the pulp derived from the plant material 402 may be directed into a mold 412. The mold 412 may comprise a base mold configured to form a base or a lid mold configured to form a lid, and the shape of the mold may depend on the desired final shape of the component (e.g., the lid or the base) being produced.

As further illustrated in FIG. 24, the pulp derived from the plant material 402 may be sprayed into the mold 412 in some embodiments. For example, a spray head 414 or other dispensing device coupled to a reservoir 416 may direct the pulp derived from the plant material 402 into the mold 412. Thereby, the pulp derived from the plant material 402, which may include water or other liquid and which may be provided in a slurry or other partially or substantially fluid form, may conform to the shape of the mold 412. Thus, for example, the mold 412 may define the shape of an exterior surface 406 of the container 400.

As illustrated in FIG. 25, in order to form the shape of an interior surface 404 of the container 400, a moveable mold 418 (e.g., a moveable lid mold configured to form the lid or a moveable base mold configured to form the base) may be directed into contact with the pulp derived from the plant material 402. Thereby, the moveable mold 418 may apply pressure to the pulp derived from the plant material 402. Thus, the mold 412 (which may also be referred to as a fixed, or primary mold) may cooperate with the moveable mold 418 (which may also be referred to as a secondary mold), to form the container 400.

For example, in some embodiments the moveable mold 418 may comprise an expandable device (e.g., a lid expandable device configured to form the lid or a base expandable device configured to form the base) configured to expand within the mold 412 to apply pressure to the pulp derived from the plant material 402. Thereby, the pulp derived from the plant material 402 may be formed into a shape defined by the moveable mold 418 and the mold 412. Although the moveable mold 418 is illustrated as defining the shape of the interior 404 of the container 400, and the mold 412 is illustrated as defining the shape of the exterior 406 of the container 400, in other embodiments this arrangement may be reversed such that the moveable mold defines the shape of the exterior of the container and the mold defines the shape of the interior of the container.

Suitable components, formulations and processing techniques useful for the preparation of suitable pulp derived from a plant material, and representative types of packaging formulations and constructions that can be suitably modified for use to provide containers in accordance with the present invention, are set forth Mohan, Packaging World (Jan. 30, 2014); Bouckley, BeverageDaily.com (Mar. 10, 2014); Bouckley, BeverageDaily.com (Jan. 28, 2015); and Pierce, Packaging Digest (May 20, 2015). Further, U.S. Pat. Appl. Pub. No. 2012/0211016 to Byrd, Jr. discloses a tobacco bioplastic composition; U.S. Pat. Appl. Pub. No. 2013/0292279 to Bengtsson et al. discloses a container including a moisture barrier layer or coating, U.S. Pat. No. 7,048,975 to Tojo et al. discloses a pulp molded container with a resin layer; and PCT Appl. Pub. WO 2013/192260 to De Gopegui et al. discloses a molded fiber bottle, each of which are incorporated herein by reference. See also, the types of components and processing techniques useful for production of the so-called EarthCoating Technologies by Planet Technologies, Inc.

Further example embodiments of commercially available products including materials that may be employed in embodiments of the containers of the present disclosure include thermoformed and molded fiber packaging from Plastic Ingenuity of Cross Plains, Wis.; FreeFormPack containers comprising a base fiber material with poly-laminates from FibreForm Packaging AB of NorrKoping, Sweden; EARTHCOATING EC-40, EC-PP-40, and EC-Hyper-Barrier coatings from Planet Technologies, Inc. of Newport Beach, Calif.; Natural 4× Laundry Detergent molded pulp bottles with inner polyethylene bags from Ecologic Brands of Oakland, Calif.; wine bottles including a molded pulp outer shell and a plastic liner available from Truett-Hurst of Healdsburg, Calif.; and paint roller trays comprising wood pulp fibers and a molded plastic inner layer from Bio Pulp Works of San Antonio, Tex.

A method for assembling a packaged product assembly is also provided. As illustrated in FIG. 26, the method may include providing a lid at operation 502. The lid may comprise a top wall defining an inner surface, a sealing member extending around a perimeter of the top wall at the inner surface, and one or more lid sidewalls extending from the top wall to a lower lip defining a lid opening. The method may also include providing a base defining an internal storage compartment at operation 504. The base may comprise a bottom wall and one or more base sidewalls extending from the bottom wall to an upper lip defining a base opening. The base sidewalls may comprise an outer portion extending from the bottom wall, an inwardly offset portion, and an angled portion extending from the inwardly offset portion to the upper lip, the angled portion defining an angle with respect to the inwardly offset portion. The method may additionally include providing a plurality of units of a product at operation 506. Further, the method may include inserting the units of the product into the internal storage compartment at operation 508. The method may also include coupling the lid to the base such that the inwardly offset portion of the base sidewalls is at least partially received within the lid sidewalls and the upper lip seals against the sealing member at operation 508.

In some embodiments coupling the lid to the base at operation 508 may comprise aligning the base with respect to the lid by contacting the angled portion of the base sidewalls with the lower lip of the lid. Coupling the lid to the base at operation 508 may also comprise biasing the upper lip against the sealing member. Biasing the upper lip against the sealing member may comprise directing the lower lip over one or more protrusions projecting outwardly from the base sidewalls.

In an additional embodiment, a method for manufacturing a container is provided. As illustrated in FIG. 27, the method may include constructing at least one of a base and a lid from a pulp derived from a plant material at operation 602. The lid may include a top wall and one or more lid sidewalls extending from the top wall to a lower lip defining a lid opening. The base may include a bottom wall and one or more base sidewalls extending from the bottom wall to an upper lip defining a base opening. The base may be moveable with respect to the lid between a coupled configuration in which an internal storage compartment defined by the base is substantially closed and a decoupled configuration in which the internal storage compartment is open.

In some embodiments constructing at least one of the base and the lid from the pulp derived from the plant material at operation 602 may include directing the pulp derived from the plant material into a base mold and a lid mold. Further, the method may include applying pressure to the pulp derived from the plant material in the base mold and the lid mold. Applying pressure to the pulp derived from the plant material may comprise expanding a base expandable device within the base mold and expanding a lid expandable device within the lid mold.

In some embodiments the method may further comprise drying the pulp derived from the plant material. Additionally, the method may include removing the lid from the lid mold and removing the base from the base mold. Directing the pulp derived from the plant material into the base mold and the lid mold may include spraying the pulp derived from the plant material into the base mold and the lid mold.

The method may further include applying a coating to at least one of the base and the lid. Applying the coating to at least one of the base and the lid may comprise applying the coating to an exterior of the lid and the base without applying the coating to the interior of the lid and the base. The method may additionally include coupling a liner to the pulp derived from the plant material.

Many modifications and other aspects of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A container, comprising:
   a lid, comprising:
     a top wall; and
     one or more lid sidewalls extending from the top wall to a lower lip defining a lid opening; and
   a base moveable with respect to the lid between a coupled configuration in which an internal storage compartment defined by the base is substantially closed and a decoupled configuration in which the internal storage compartment is open, the base comprising:
     a bottom wall;
     one or more base sidewalls extending from the bottom wall to an upper lip defining a base opening;
     one or more vent channels extending around a circumference of the one or more base sidewalls and from the upper lip to a shoulder defined between the upper lip and the bottom wall, the one or more channels providing venting to the internal storage compartment when the lid is seated on the base; and
     an intermediate wall spaced upwardly from the bottom wall so as to define an internal space therebetween,
   wherein at least one of the lid and the base is pulp-molded from a pulp derived from a processed plant material, the pulp being a mixture incorporating the processed plant material so that the processed plant material is a majority of the weight of the pulp, and
   wherein at least one of the lid and the base further comprises a coating positioned at an exterior of at least one of the lid and the base and not positioned at an interior of the lid and the base.

2. The container of claim 1, wherein the pulp derived from the processed plant material comprises a wood pulp material.

3. The container of claim 1, wherein at least one of the base and the lid comprises a liner.

4. The container of claim 1, in combination with a plurality of units of a product received in the internal storage compartment.

5. The container of claim 4, wherein the product is selected from the group consisting of pharmaceutical products, smoking products, smokeless tobacco products, and consumable products.

6. The container of claim 4, wherein the product is a smokeless tobacco product.

7. The container of claim 1, wherein the intermediate wall comprises a plurality of apertures extending therethrough.

8. A method for manufacturing a container, comprising:
   pulp-molding at least one of a base and a lid from a pulp derived from a processed plant material, the pulp being a mixture incorporating the processed plant material so that the processed plant material is a majority of the weight of the pulp, the lid, comprising:
     a top wall; and
   one or more lid sidewalls extending from the top wall to a lower lip defining a lid opening; and
   the base comprising:
     a bottom wall;
     one or more base sidewalls extending from the bottom wall to an upper lip defining a base opening; and
     one or more vent channels extending around a circumference of the one or more base sidewalls and from the upper lip to a shoulder defined between the upper lip and the bottom wall, the one or more channels providing venting to the internal storage compartment when the lid is seated on the base; and
     an intermediate wall spaced upwardly from the bottom wall so as to define an internal space therebetween,
   the base being moveable with respect to the lid between a coupled configuration in which an internal storage compartment defined by the base is substantially closed and a decoupled configuration in which the internal storage compartment is open; and
   applying a coating to an exterior of at least one of the base and the lid without applying the coating to the interior of the lid and the base.

9. The method of claim 8, wherein pulp-molding at least one of the base and the lid from the pulp derived from the processed plant material comprises directing the pulp derived from the processed plant material into a base mold and a lid mold.

10. The method of claim 9, further comprising applying pressure to the pulp derived from the processed plant material in the base mold and the lid mold.

11. The method of claim 10, wherein applying pressure to the pulp derived from the processed plant material comprises expanding a base expandable device within the base mold and expanding a lid expandable device within the lid mold.

12. The method of claim 11, further comprising drying the pulp derived from the processed plant material.

13. The method of claim 12, further comprising removing the lid from the lid mold and removing the base from the base mold.

14. The method of claim 9 wherein directing the pulp derived from the processed plant material into the base mold and the lid mold comprises spraying the pulp derived from the processed plant material into the base mold and the lid mold.

15. The method of claim 8, further comprising coupling a liner to the pulp derived from the processed plant material.

* * * * *